United States Patent
Park et al.

(10) Patent No.: US 7,885,693 B2
(45) Date of Patent: Feb. 8, 2011

(54) SLIDING DEVICE FOR DUAL SLIDING-TYPE PORTABLE COMMUNICATION APPARATUS

(75) Inventors: Myoung-Hoon Park, Seoul (KR); Byung-Chan Lee, Seongnam-si (KR); Soo-Ik Jung, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1131 days.

(21) Appl. No.: 11/208,556

(22) Filed: Aug. 23, 2005

(65) Prior Publication Data

US 2006/0046796 A1    Mar. 2, 2006

(30) Foreign Application Priority Data

Aug. 24, 2004  (KR)  .................. 10-2004-0066698
Apr. 6, 2005   (KR)  .................. 10-2005-0028427
Aug. 3, 2005   (KR)  .................. 10-2005-0070904

(51) Int. Cl.
*H04M 1/00* (2006.01)

(52) U.S. Cl. .................. 455/575.4; 455/575.3
(58) Field of Classification Search ............ 455/575.4, 455/575.3
See application file for complete search history.

(56) References Cited

U.S. PATENT DOCUMENTS

| | | | | |
|---|---|---|---|---|
| 1,216,169 | A * | 2/1917 | Rochester | 16/238 |
| 5,653,714 | A * | 8/1997 | Dietz et al. | 606/87 |
| 6,499,712 | B1 * | 12/2002 | Clark et al. | 248/429 |
| 6,882,335 | B2 | 4/2005 | Saarinen | |
| 6,961,593 | B1 | 11/2005 | Lonka et al. | |
| 6,963,756 | B2 | 11/2005 | Lubowicki et al. | |
| 6,973,186 | B2 | 12/2005 | Shin | |
| 7,003,104 | B2 | 2/2006 | Lee | |
| 7,081,947 | B2 | 7/2006 | Gui et al. | |
| 7,084,345 | B1 | 8/2006 | Chen et al. | |
| 7,091,957 | B2 | 8/2006 | Duarte et al. | |
| 7,092,747 | B2 | 8/2006 | Park et al. | |
| 7,107,018 | B2 * | 9/2006 | Jellicoe | 455/90.3 |
| 7,142,420 | B2 | 11/2006 | Santos et al. | |
| 7,162,283 | B2 | 1/2007 | Bae et al. | |
| 7,240,400 | B2 * | 7/2007 | Bonham | 16/238 |
| 7,422,436 | B2 * | 9/2008 | Lee | 439/10 |

(Continued)

FOREIGN PATENT DOCUMENTS

CN    1849801 A    10/2006

(Continued)

OTHER PUBLICATIONS

U.S. Appl. No. 11/005,415, filed Dec. 6, 2004, Lee et al., Samsung Electronics Co. Ltd.

*Primary Examiner*—Yuwen Pan
(74) *Attorney, Agent, or Firm*—Roylance, Abrams, Berdo & Goodman, LLP.

(57) ABSTRACT

A dual sliding-type portable communication apparatus having a housing configured to slide in a twofold manner is provided. The apparatus includes a main housing, a sliding housing which is configured to slide on the main housing to expose/hide the main housing, a slider, and a dual sliding guide slidably coupled to the slider to enable the sliding housing to slide towards or away from the main housing in the longitudinal or perpendicular directions.

33 Claims, 47 Drawing Sheets

U.S. PATENT DOCUMENTS

| | | |
|---|---|---|
| 7,671,836 B2 * | 3/2010 | Lehtonen .................... 345/156 |
| 2003/0064688 A1 | 4/2003 | Mizuta et al. |
| 2005/0009581 A1 | 1/2005 | Im et al. |
| 2005/0049019 A1 | 3/2005 | Lee |
| 2005/0059438 A1 * | 3/2005 | Jellicoe ................... 455/575.1 |
| 2005/0070348 A1 * | 3/2005 | Lee et al. ................. 455/575.4 |
| 2005/0091431 A1 * | 4/2005 | Olodort et al. ................ 710/72 |
| 2005/0095995 A1 | 5/2005 | Bae |
| 2005/0096082 A1 * | 5/2005 | Chang .................... 455/550.1 |
| 2005/0104856 A1 | 5/2005 | Jacobs et al. |
| 2005/0107137 A1 | 5/2005 | Byun et al. |
| 2005/0125570 A1 * | 6/2005 | Olodort et al. ................ 710/15 |
| 2005/0130720 A1 | 6/2005 | Finke-Anlauff |
| 2005/0221873 A1 | 10/2005 | Kameyama et al. |
| 2005/0255897 A1 * | 11/2005 | Lee et al. ................. 455/575.4 |
| 2006/0046796 A1 | 3/2006 | Park et al. |
| 2006/0063569 A1 | 3/2006 | Jacobs et al. |
| 2006/0063571 A1 | 3/2006 | Chadha |
| 2006/0135229 A1 | 6/2006 | Kwak et al. |
| 2006/0146014 A1 | 7/2006 | Lehtonen |
| 2006/0252471 A1 | 11/2006 | Pan |
| 2006/0293093 A1 | 12/2006 | Marcus |
| 2007/0049356 A1 | 3/2007 | Jung et al. |
| 2007/0080950 A1 * | 4/2007 | Lee et al. .................... 345/169 |
| 2007/0142101 A1 * | 6/2007 | Seshagiri et al. ......... 455/575.4 |
| 2007/0243896 A1 * | 10/2007 | Maatta et al. ............ 455/550.1 |
| 2007/0243897 A1 * | 10/2007 | Maatta et al. ............ 455/550.1 |
| 2007/0254730 A1 * | 11/2007 | Kim et al. ................ 455/575.4 |

FOREIGN PATENT DOCUMENTS

| | | |
|---|---|---|
| DE | 203 17 865 | 3/2004 |
| GB | 2 407 933 | 5/2005 |
| WO | WO 02/091149 | 11/2002 |
| WO | WO 03/050665 | 6/2003 |
| WO | WO 2004/049150 | 6/2004 |
| WO | WO 2005/043870 A | 5/2005 |
| WO | WO 2006/072657 A | 7/2006 |

* cited by examiner

SLIDING DEVICE FOR DUAL SLIDING-TYPE PORTABLE COMMUNICATION APPARATUS

PRIORITY

This application claims the benefit under 35 U.S.C. 119(a) of patent applications Serial No. 2004-66698 filed on Aug. 24, 2004, Serial No. 2005-28427 filed on Apr. 6, 2005, and Serial No. 2005-70904 filed on Aug. 3, 2005 in the Korean Intellectual Property Office , the entire disclosures of which are hereby incorporated by reference.

BACKGROUND OF THE INVENTION

1. Field of the Invention

The present invention relates to dual sliding-type portable communication apparatuses comprising, for example, cellular phones, personal digital assistants (PDAs), hand held phones (HHPs), and digital communication apparatuses. More particularly, the present invention relates to a dual sliding-type portable communication apparatus having a housing adapted to slide in a twofold manner.

2. Description of the Related Art

In general, a "sliding-type portable communication apparatus" refers to an electronic apparatus that a user can carry to perform wireless communication with a desired partner. To facilitate portability, designs of sliding-type portable communication apparatuses tend not only to be compact, slim, and lightweight, but are also moving toward providing multimedia availability, having a wider variety of functions. In particular, future portable communication apparatuses are expected to incorporate greater multi-functionality and be capable of multi-purpose utilization, as well as being more compact, lightweight, and capable of being modified to be suitable for various multimedia or Internet environments. Additionally, portable communication apparatuses are now used by people of all ages and all walks of life throughout the world, and are recognized by some people as a nearly indispensable commodity.

Conventional portable communication apparatuses may be classified into various categories according to their appearance, such as bar-type communication apparatuses, flip-type communication apparatuses, and folder-type communication apparatuses. The bar-type communication apparatuses have a single housing shaped like a bar. The flip-type communication apparatuses have a flip rotatably coupled to a bar-shaped housing by a hinge device. The folder-type communication apparatuses have a folder connected to a single bar-shaped housing by a hinge device in such a manner that the folder can be rotated to fold on or unfold from the housing.

In addition, portable communication apparatuses may be classified into rotation-type communication apparatuses and sliding-type communication apparatuses according to the manner of opening and closing the communication apparatuses. In the rotation-type communication apparatuses, two housings are coupled to each other in such a manner that one housing rotates to be opened or closed relative to the other while they face each other. In the sliding-type communication apparatuses, two housings are coupled to each other in such a manner that one housing slides in the longitudinal direction to be opened or closed relative to the other housing.

Meanwhile, conventional portable communication apparatuses now tend to transmit data at high speeds in addition to performing the basic voice communication function. In other words, as a result of the increase in consumer demand, portable communication apparatuses now tend to provide a service using wireless communication technology capable of transmitting data at high speeds.

Recent portable communication apparatuses also tend to be equipped with a camera lens to obtain video for transmission. That is, current sliding-type portable communication apparatuses have an external or embedded camera lens module to enable users to perform video communication with desired partners or to photograph desired subjects.

However, conventional portable communication apparatuses have a problem in that, since one of their two housings can slide only in one direction while they face each other and expose about half the length of the other stationary housing, it is impossible to use the whole area of the apparatus. This restricts the installation of keys and a liquid crystal display (LCD).

In addition, the small number of keys positioned in the limited area of the apparatus makes it inconvenient to operate the keys for inputting characters or for a game mode.

Accordingly, there is a need for an improved dual sliding-type portable communication apparatus which enables more keys and larger LCD installation.

SUMMARY OF THE INVENTION

Exemplary embodiments of the present invention address at least the above problems and/or disadvantages and provide at least the advantages described herein. Accordingly, an exemplary implementation of the present invention provides a dual sliding-type portable communication apparatus having a housing adapted to slide in a twofold manner so that more keys and a larger liquid crystal display (LCD) can be installed in the increased service region for convenience.

Another exemplary implementation of the present invention provides a dual sliding-type portable communication apparatus having a large number of keys for convenient key operation for using both hands when inputting characters or when used in a game mode.

Another exemplary implementation of the present invention provides a sliding device for a dual sliding-type portable communication apparatus having a sliding module laminated inside a housing of the apparatus for an independent sliding movement in each direction.

Still yet another an exemplary implementation of the present invention is to provide a sliding device for a dual sliding-type portable communication apparatus having a guide stopper positioned on the interior of housings without being exposed to the exterior to guide or restrict the movement of the sliding housing for aesthetic appearance of the apparatus.

In order to accomplish these exemplary implementations, there is provided a dual sliding-type portable communication apparatus comprising a main housing, a sliding housing configured to slide on the main housing to expose/hide the main housing, a slider, and a dual sliding guide coupled to the slider to enable the sliding housing to slide towards or away from the main housing in the longitudinal or perpendicular directions.

In accordance with another exemplary implementation of the present invention, there is provided a sliding device for a dual sliding-type portable communication apparatus having a main housing and a sliding housing configured to slide on the main housing to expose/hide the main housing. The sliding device comprises a base member, a first sliding member arranged, such as by lamination, on the base member to semi-automatically slide the sliding housing from the main housing in the longitudinal direction, a second sliding member laminated on the first sliding member to semi-automatically slide the sliding housing from the main housing in the perpendicular direction, first and second force supply members positioned between each member to provide a force so that the first and second sliding members can slide semi-automatically, and at least one stopper member configured to rotate and fasten/release, as each member slides, and restrict the first and second sliding members so that each member can independently slide in the longitudinal and perpendicular directions, respectively.

In accordance with another an exemplary implementation of the present invention, there is provided a sliding device for a dual sliding-type portable communication apparatus having a main housing and a sliding housing configured to slide on the main housing to expose/hide the main housing. The sliding device comprises a base member, a first sliding member arranged, such as by lamination, on the base member to semi-automatically slide the sliding housing from the main housing in the longitudinal direction, a second sliding member arranged, such as by lamination, on the first sliding member to semi-automatically slide the sliding housing from the main housing in the perpendicular direction, and an elastic member positioned between each member to provide an elastic force so that the first and second sliding members can slide semi-automatically, and at least one stopper member configured to rotate and fasten/release, as each member slides, and restrict the first and second sliding members so that each member can independently slide in the longitudinal and perpendicular directions, respectively.

In accordance with another exemplary implementation of the present invention, there is provided a sliding device for a dual sliding-type portable communication apparatus having a main housing and a sliding housing configured to slide on the main housing to expose/hide the main housing. The sliding device comprises a base member, first and second sliding members arranged, such as by lamination, on the base member to semi-automatically slide the sliding housing from the main housing in the longitudinal and perpendicular directions, respectively, at least one elastic member positioned between each member to provide an elastic force so that the first and second sliding members can slide semi-automatically, and a guide stopper member positioned on each housing to guide and restrict the sliding housing so that the sliding housing can independently slide from the main housing in the longitudinal and perpendicular directions and stop in the final position of each sliding movement.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
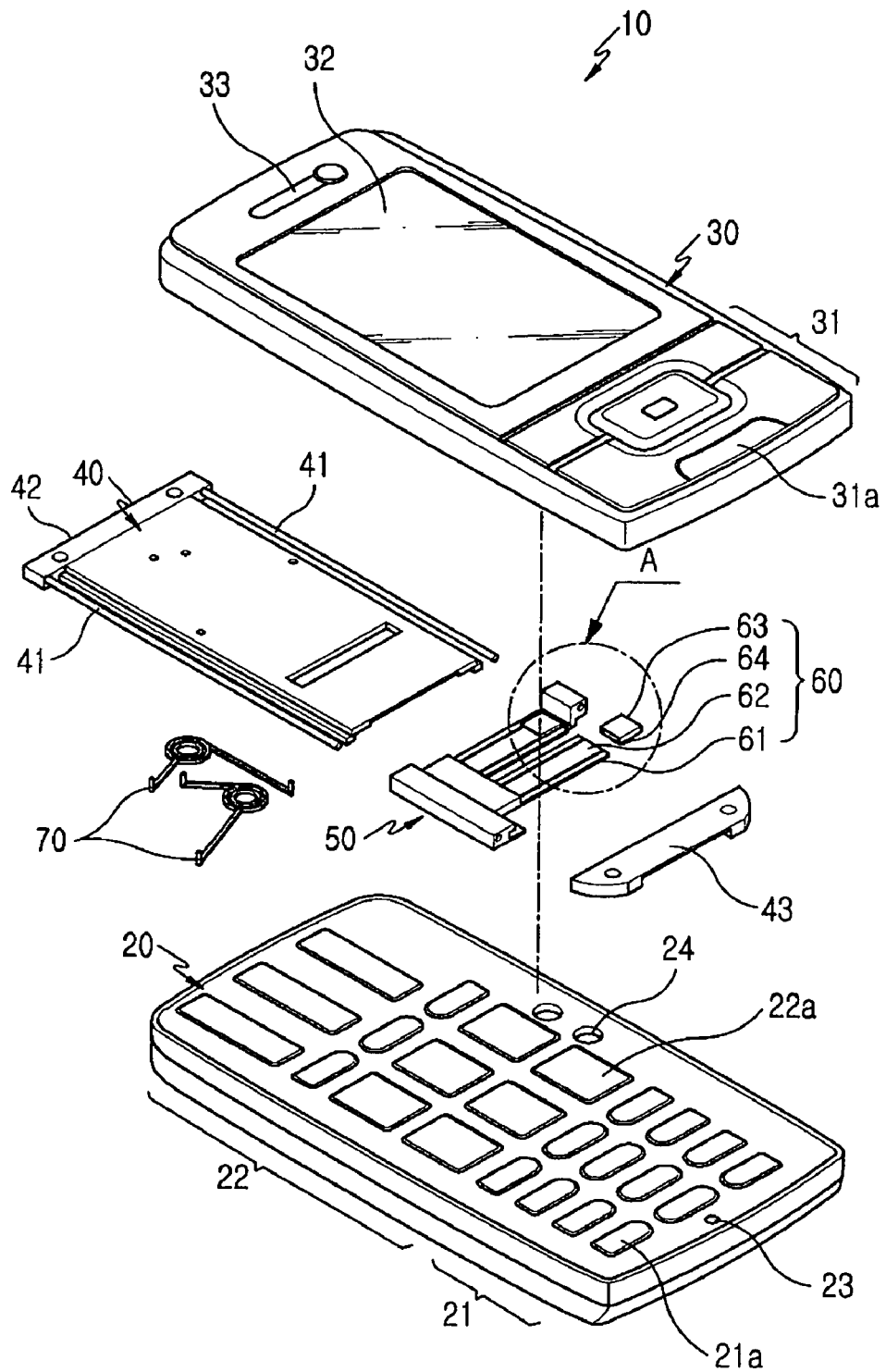
FIG. 1 is an exploded perspective view showing an example of the construction of a dual sliding-type portable communication apparatus according to an embodiment of the present invention.

As shown in the exemplary implementation of FIG. 1, a dual sliding-type portable communication apparatus 10 includes a main housing 20, a sliding housing 30, a slider 40, and a dual sliding guide 50. The sliding housing 30 is positioned on the upper surface of the main housing 20 so that it can slide in the longitudinal direction A1 of the main housing 20 and in the perpendicular direction A2 to the longitudinal direction A1 while facing the main housing 20. The slider 40 is positioned on a surface of the sliding housing 30 and is slidably coupled to the dual sliding guide 50. The dual sliding guide 50 is slidably coupled to the slider 40. The dual sliding guide 50 is positioned on a surface of the main housing 20 to slide the sliding housing 30 towards or away from the main housing 20 in the longitudinal direction A1 or in the perpendicular direction A2.

Figure 2:
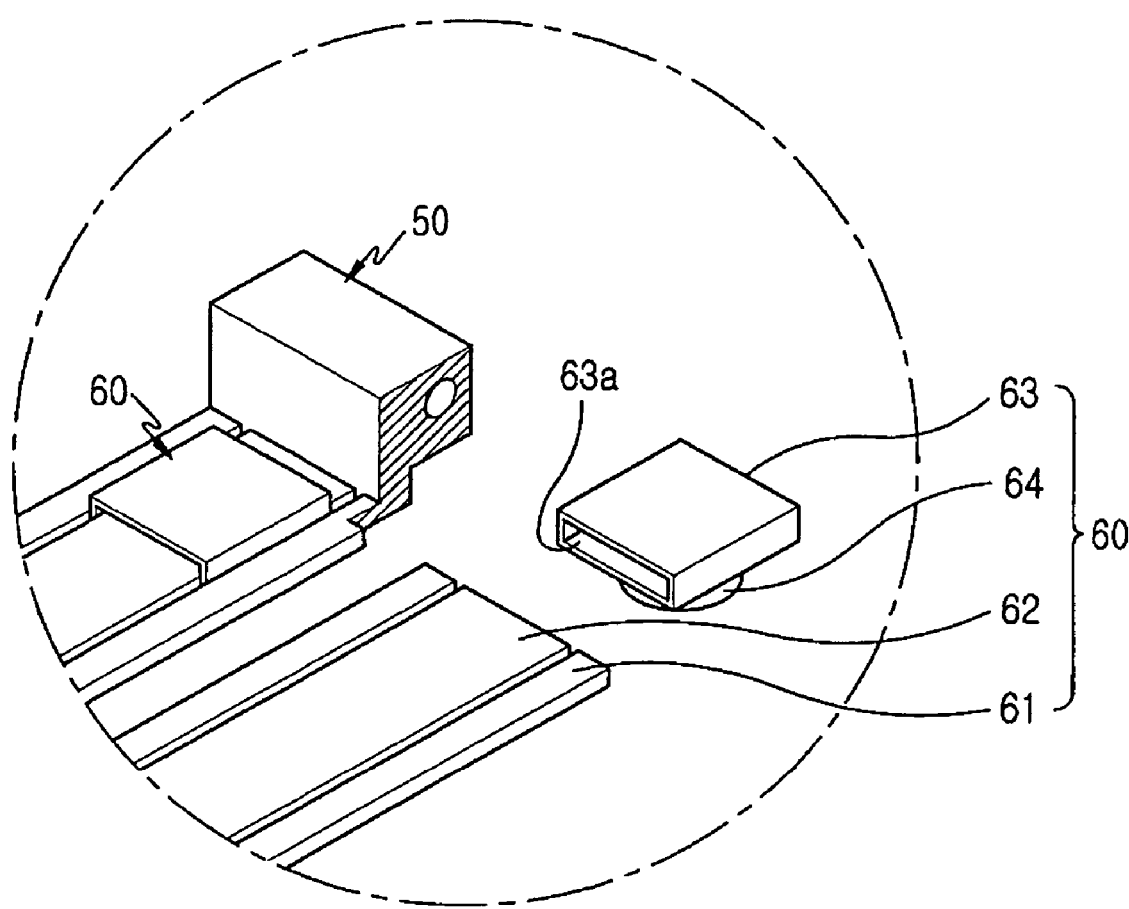
FIG. 2 is an exploded perspective view magnifying part A of FIG. 1.

As shown in the exemplary embodiments of FIGS. 1 and 2, the slider 40 has at least one guide rod 41 fixed to each of both lateral surfaces so that the dual sliding guide 50 can be coupled thereto while being able to slide in the longitudinal direction A1. The dual sliding guide 50 has a sliding movement device 60 positioned on a lateral surface thereof for fixedly coupling to a surface of the main housing 20 and to slide the sliding housing 30 in the perpendicular direction A2. The dual sliding guide 50 is configured to move linearly.

As shown in the exemplary implementation of FIG. 1, at least one elastic member is positioned between the dual sliding guide 50 and the slider 40 to provide an elastic force so that the sliding housing 30 can slide in the longitudinal direction A1. The elastic member comprises a wire spring 70. As shown in FIG. 1, the guide rod 41 may have a substantially cylindrical shape; however, other suitable arrangements and constructions maybe used.

As shown in the exemplary embodiments of FIG. 2, the sliding movement device 60 includes a guide member 61, a guide rail 62, at least one sliding boss 63, and a boss protrusion 64. The guide member 61 is formed inside the sliding movement device 60 in the perpendicular direction A2 to the longitudinal direction of the sliding housing 30 to accommodate the guide rail 62. The guide rail 62 is positioned inside the guide member 61 and is slidably coupled to the sliding boss 63. The sliding boss 63 is slidably coupled to the guide rail 62 so that it can slide in the longitudinal direction of the guide rail 62. The boss protrusion 64 protrudes from a surface of the sliding boss 63 and is fixedly coupled to a fixing hole 24 formed on the main housing 20.

As shown in the exemplary implementation of FIG. 1, the main housing 20 has at least one fixing hole 24 formed thereon to be coupled and fixed to the boss protrusion 64. The sliding boss 63 is linearly configured to move on the main housing 20. As shown in the exemplary embodiment of FIG. 2, the sliding boss 63 has a sliding hole 63a formed thereon so that the guide rail 62 extends through to be coupled thereto while being able to slide.

As shown in the exemplary embodiments of FIGS. 3 to 12, the main housing 20 may have, for example, on its upper surface, a microphone device 23 and first and second key arrays 21 and 22 comprising arrays of a number of keys 21a and 22a, respectively, which are exposed/hidden as the sliding housing 30 slides in the longitudinal direction A1 or in the perpendicular direction A2. As shown in the exemplary embodiments of FIG. 14, the second key array 22 includes four-way keys 22b, game-dedicated keys 22c, and an auxiliary speaker device 22d. As shown in an exemplary embodiment of FIG. 3, the sliding housing 30 may have a speaker device 33 positioned on the upper surface thereof, a large LCD 32 positioned adjacent to the speaker device 33, and a third key array 31 comprising an array of a number of keys 31a positioned adjacent to the large LCD 32.

As shown in the exemplary implementation of FIG. 1, the slider 40 has first and second support ribs 42 and 43 formed on both longitudinal ends thereof, respectively, while extending in the perpendicular direction A2 to support the guide rods 41.

The operation of the dual sliding-type portable communication apparatus according to the first exemplary implementation of the present invention, constructed as above, will now be described in more detail with reference to the exemplary embodiments of FIGS. 1 to 14.

Figure 3:
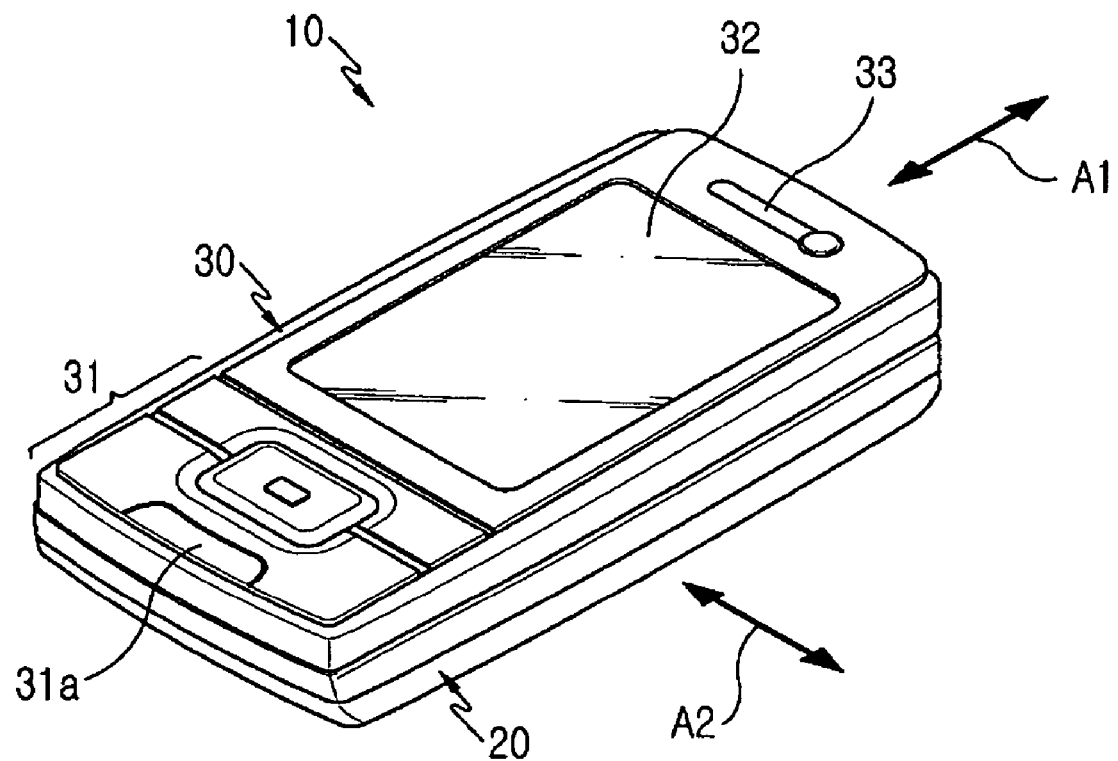
FIG. 3 is an example of an assembled perspective view showing the dual sliding-type portable communication apparatus according to an embodiment of the present invention.
Figure 4:
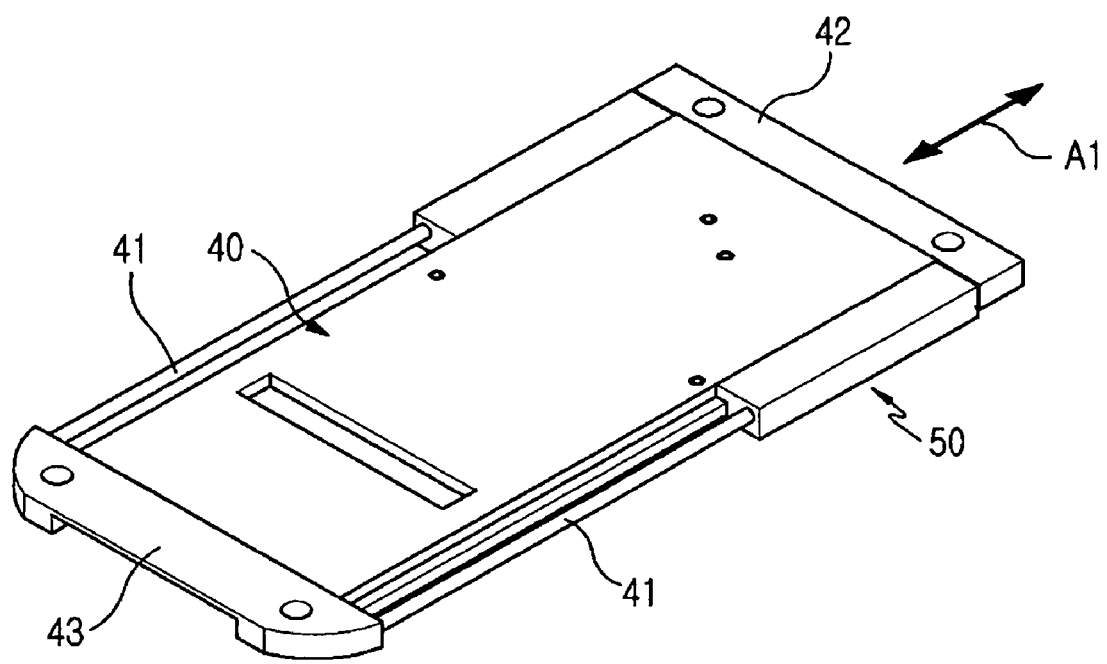
FIG. 4 is a perspective view showing an exemplary slider and a dual sliding guide, which are coupled to each other according to an embodiment of the present invention.
Figure 5:
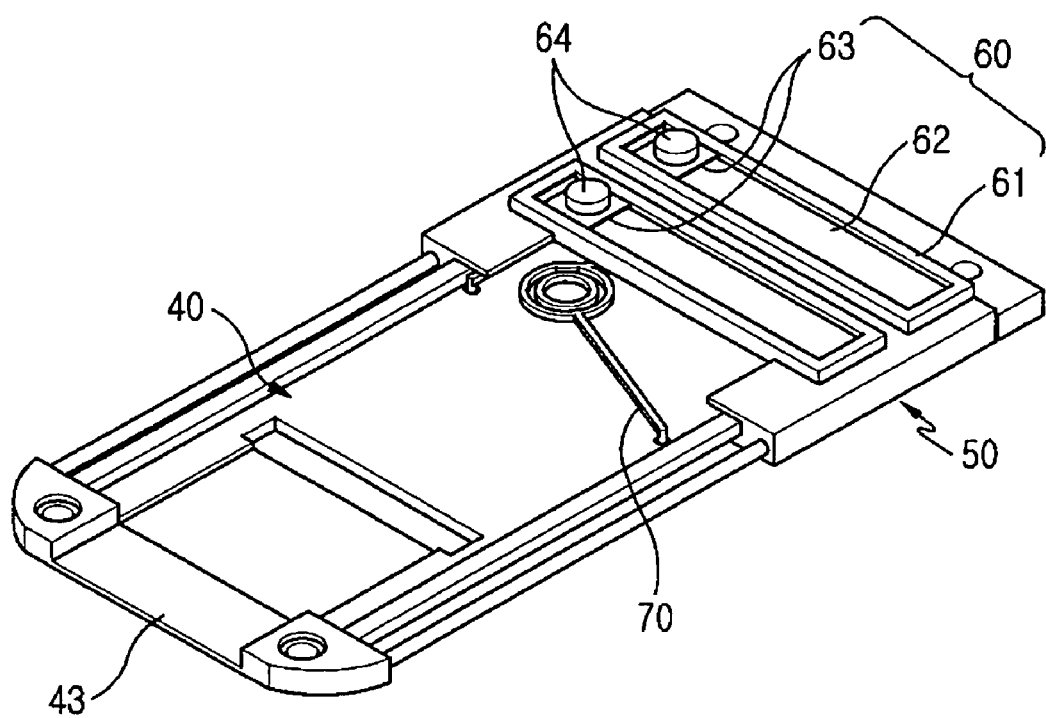
FIG. 5 is a perspective view showing an example of a rear view of a dual sliding guide, and a sliding movement device, which are coupled to one another according to an exemplary embodiment of the present invention.
Figure 6:
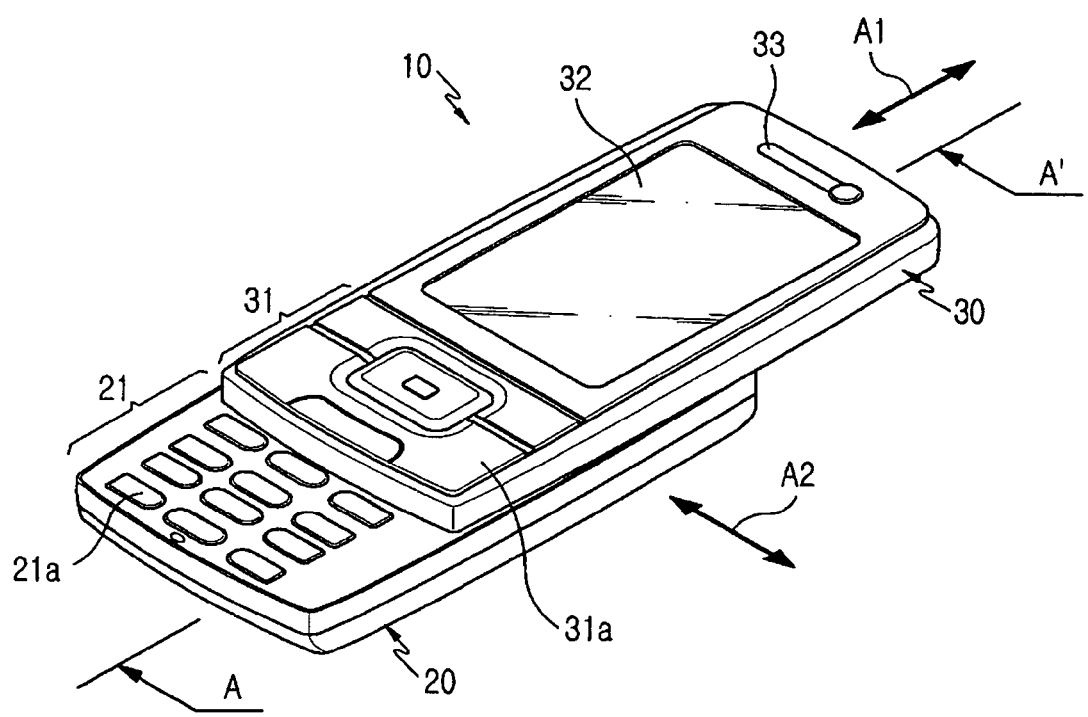
FIG. 6 is a perspective view showing an example of a dual sliding-type portable communication apparatus after its sliding housing has slid in the longitudinal direction of the main housing according to an embodiment of the present invention.
Figure 7:
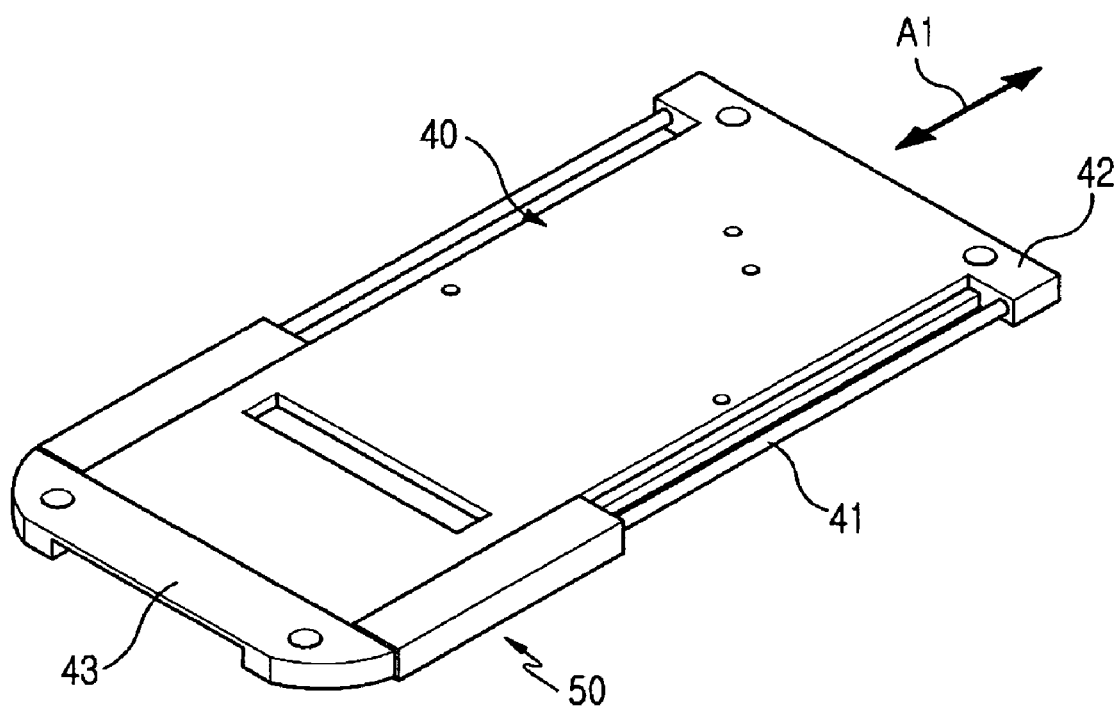
FIG. 7 is a perspective view showing an example of a slider and a dual sliding guide, which are coupled to each other after its sliding housing has slid in the longitudinal direction of the main housing according to an embodiment of the present invention.
Figure 8:
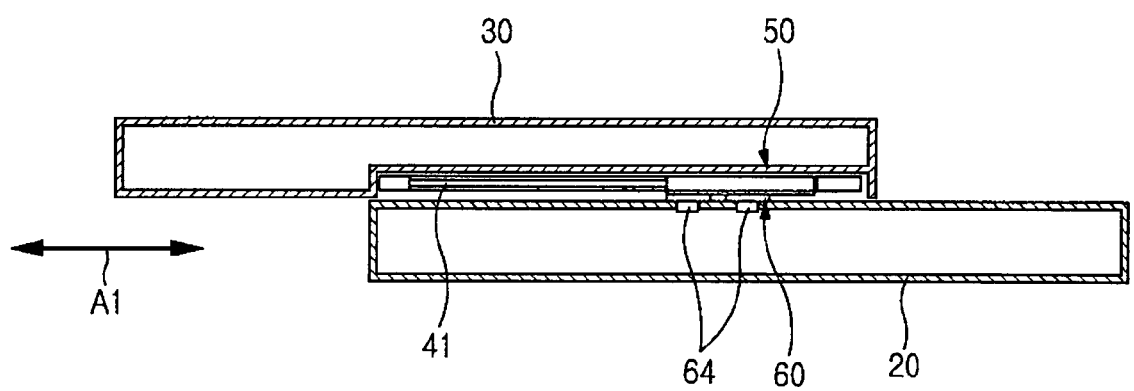
FIG. 8 is a sectional view taken along line A-A' of FIG. 6.

As shown in the exemplary embodiments of FIGS. 1 and 2, the dual sliding-type portable communication apparatus 10 has a slider 40 coupled to a surface of the sliding housing 30 and is provided with a guide rod 41. As shown in the exemplary embodiment of FIG. 1, a dual sliding guide 50 is coupled to the guide rod 41 and to the main housing 20. The dual sliding guide 50 has a sliding movement device 60 positioned on a lateral surface thereof, which is fixedly coupled to a surface of the main housing 20 to slide the sliding housing 30 in the perpendicular direction A2. As shown in the exemplary embodiments of FIGS. 8 and 13, the sliding movement device 60 has a boss protrusion 64 formed thereon, which is fitted into and fixed to at least one fixing hole 24 formed on the main housing 20. As shown in the exemplary embodiments of FIGS. 3 and 6, the sliding housing 30 slides from the main housing 20 in the longitudinal direction A1. As shown in FIGS. 3 and 7, the dual sliding guide 50 slides away in the longitudinal direction along the guide rod 41 provided on the slider 40. As shown in the exemplary embodiments of FIGS. 6 and 8, the sliding housing 30 exposes the first key array 21 comprising an array of a number of keys 21a on the main housing 20. The dual sliding guide 50 moves linearly in the longitudinal direction A1.

Figure 9:
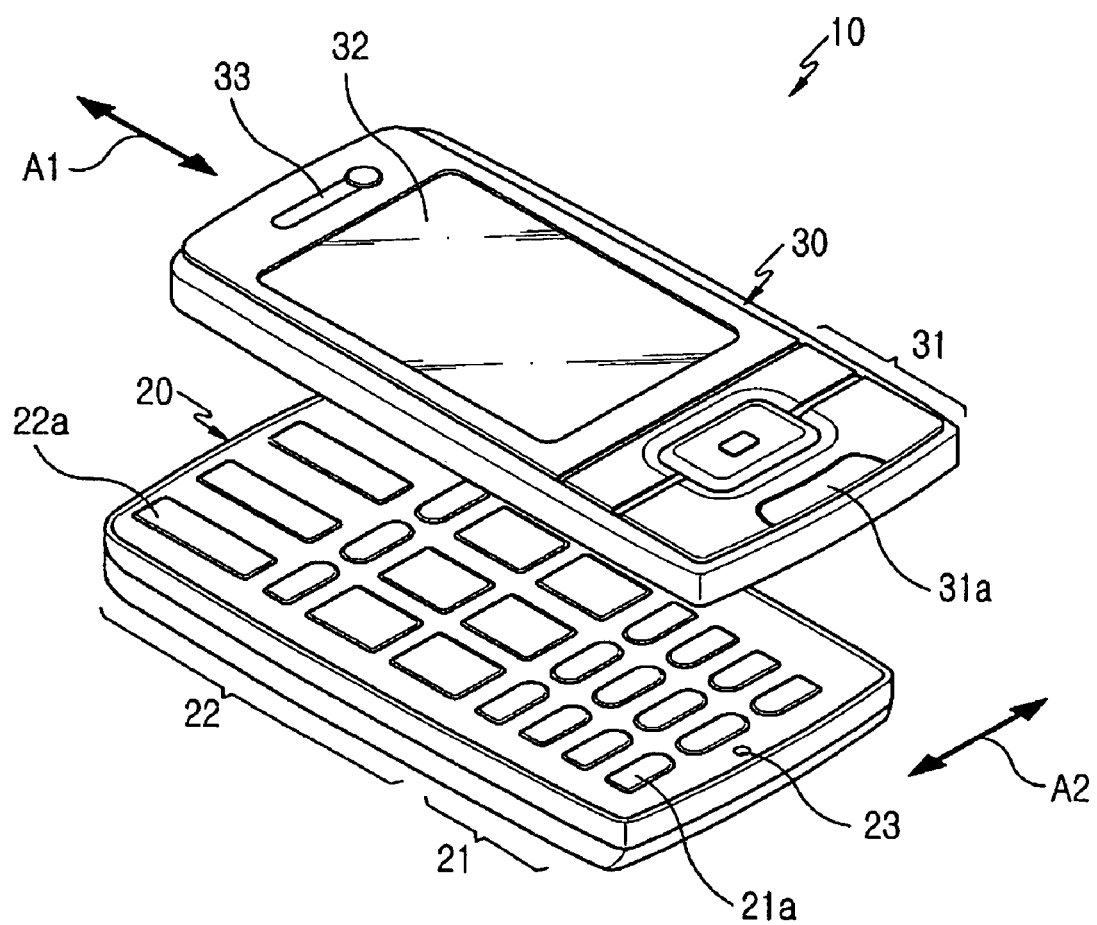
FIG. 9 is a perspective view showing an example of a dual sliding-type portable communication apparatus after its sliding housing has slid in a direction perpendicular to the longitudinal direction of the main housing according to an embodiment of the present invention.
Figure 10:
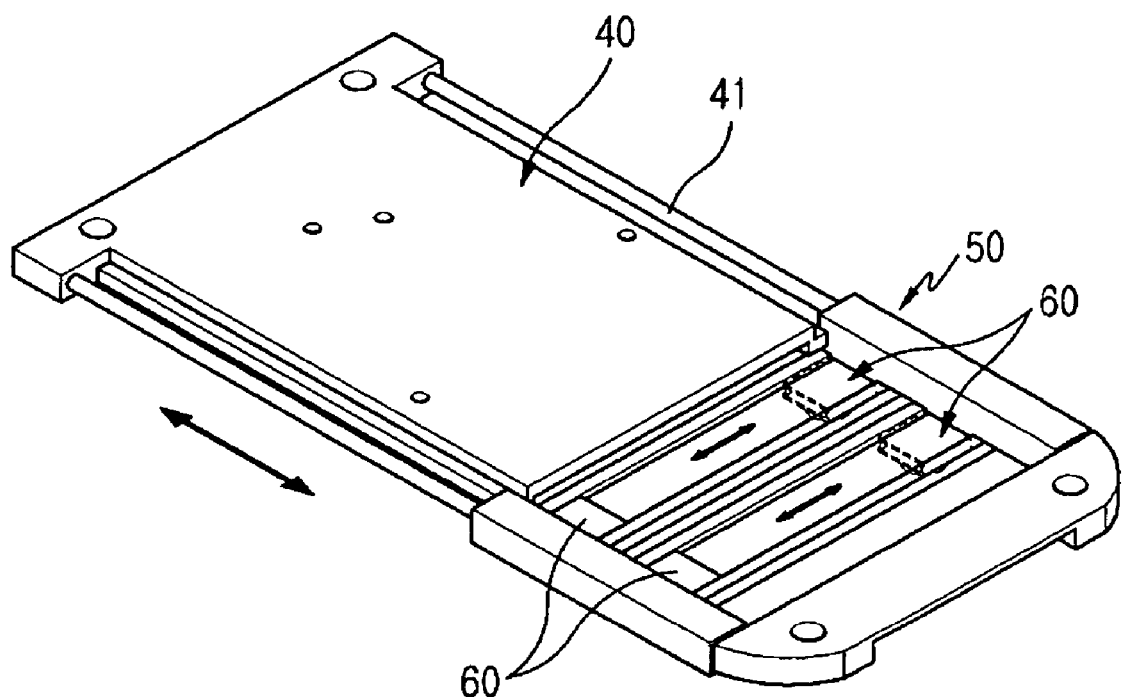
FIG. 10 is a perspective view showing an example of the operation of a dual sliding guide and a sliding movement device among the construction of a dual sliding-type portable communication apparatus according to an embodiment of the present invention, after its sliding housing has slid in a direction perpendicular to the longitudinal direction of the main housing.

As shown in the exemplary embodiments of FIG. 9, the sliding housing 30 slides from the main housing 20 in the perpendicular direction A2. As shown in the exemplary embodiments of FIGS. 10 and 11, the sliding boss 63 of the sliding movement device 60 moves in the perpendicular direction A2 along the guide rail 62 provided on a lateral surface of the dual sliding guide 50. As shown in the exemplary embodiments of FIG. 10, since the sliding boss 63 has a sliding hole 63a formed thereon to extend through and be coupled to the guide rail 62, while being able to slide, the sliding boss 63 can slide on the guide rail 62 via the sliding hole 63a.

Figure 11:
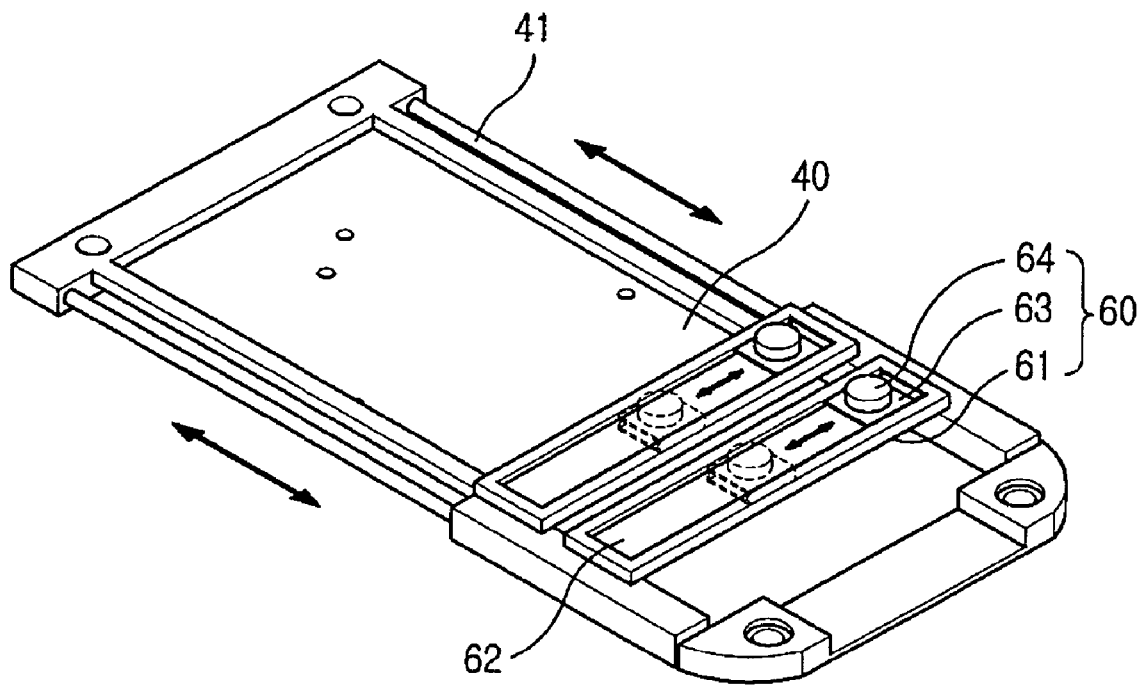
FIG. 11 is a perspective view showing a rear view of an example of the operation of a dual sliding guide and a sliding movement device among the construction of a dual sliding-type portable communication apparatus according to an embodiment of the present invention, after its sliding housing has slid in a direction perpendicular to the longitudinal direction of the main housing.

As shown in the exemplary embodiments of FIG. 11, the sliding boss 63 and the boss protrusion 64 slide together as the sliding housing 30 moves. As shown in the exemplary embodiments of FIGS. 10 and 11, the guide rail 62 is positioned in the guide member 61, which for example, may be formed inside the dual sliding guide 50 in the perpendicular direction A2. As shown in the exemplary embodiments of FIG. 9, the sliding housing 30 slides away from the main housing 20 in the perpendicular direction A2 and exposes the first and second key arrays 21 and 22 of the main housing 20. As shown in the exemplary embodiments of FIGS. 12 and 13, the sliding housing 30 slides towards the main housing 20 in the longitudinal direction A1 and then slides away from the main housing 20 in the perpendicular direction. Then, the first and second key arrays 21 and 22 of the main housing 20 are exposed. The user now can use the keys 21a and 22a included in the first and second key arrays 21 and 22. When the user wants to use the apparatus in a game mode, as shown in the exemplary embodiments of FIG. 14, the four-way keys 22b, the game-dedicated keys 22c, and the auxiliary speaker device 22d included in the second key array 22 are ready for use.

Figure 12:
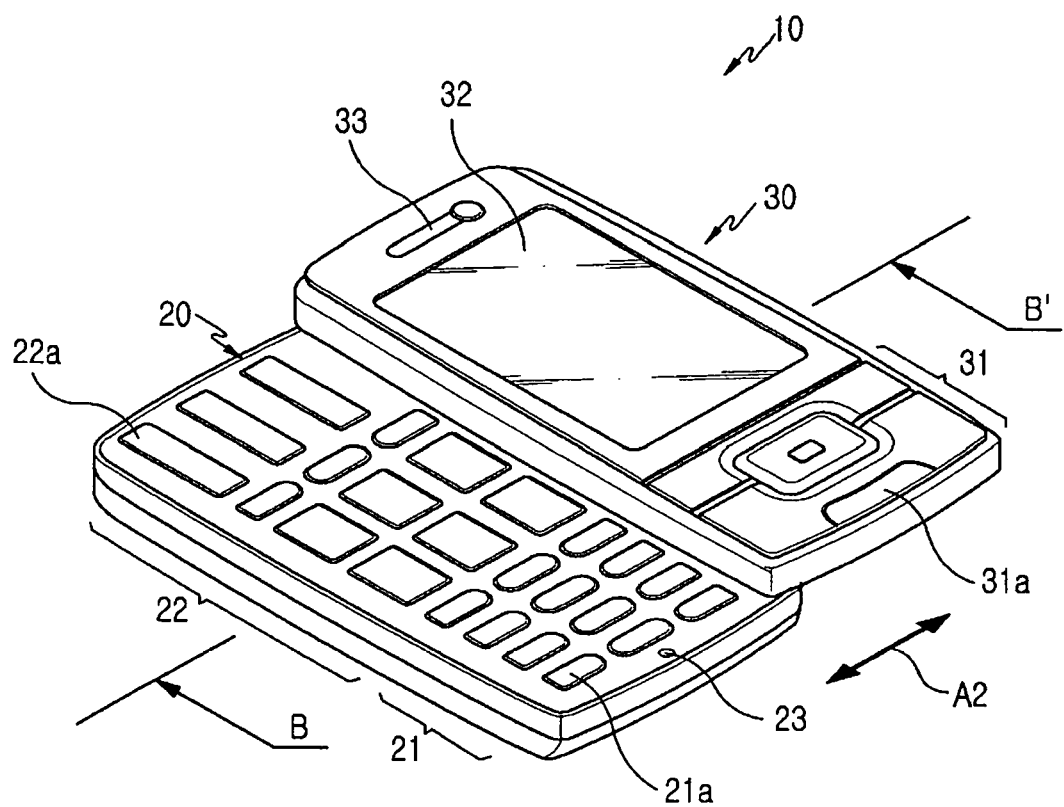
FIG. 12 is a perspective view showing an example of a dual sliding-type portable communication apparatus according to an embodiment of the present invention, after its sliding housing has slid in a direction perpendicular to the longitudinal direction of the main housing and the first and second key arrays of the main housing have been exposed.
Figure 13:
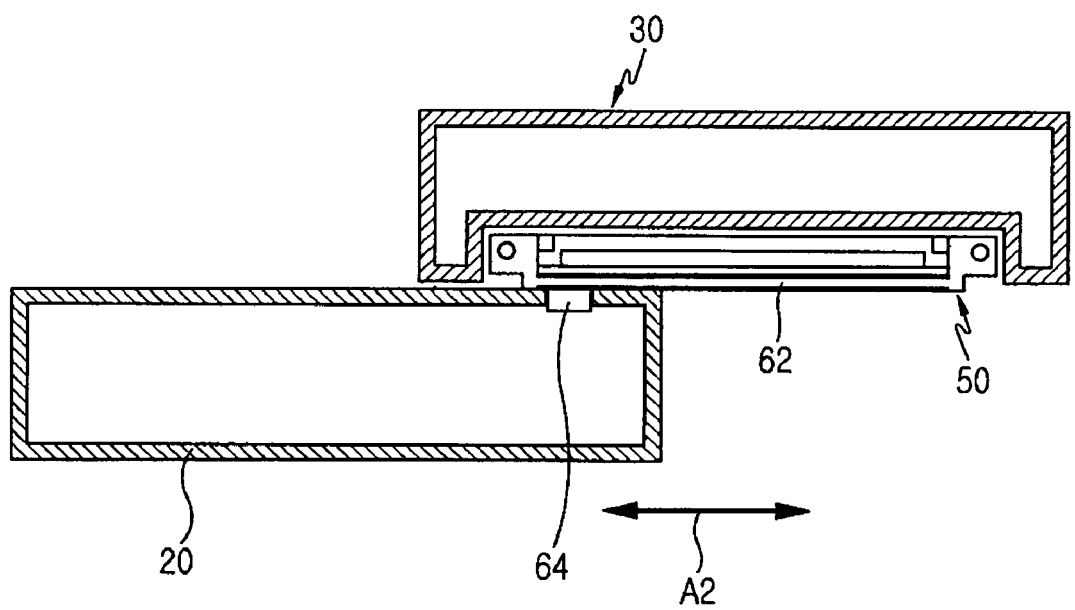
FIG. 13 is a sectional view taken along line B-B' of FIG. 12.
Figure 14:
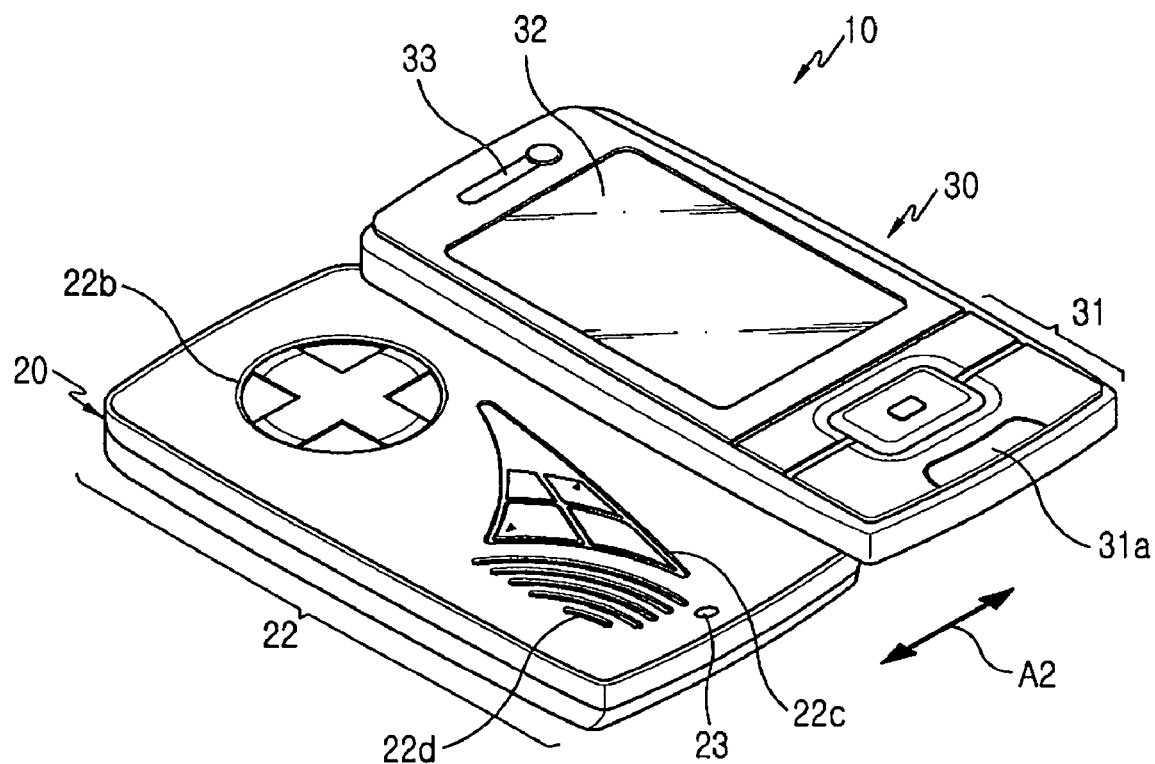
FIG. 14 is a perspective view showing an example of a dual sliding-type portable communication apparatus according to an embodiment of the present invention, after its sliding housing has slid in a direction perpendicular to the longitudinal direction of the main housing and the four-way keys and the game-dedicated keys positioned on the main housing have been exposed.

As shown in the exemplary embodiments of FIGS. 9, 12, and 14, the sliding housing 30 has, for example, on its upper surface, a speaker device 33, a large LCD 32, and a third key array 31 comprising a number of keys 31a. When the first and second key arrays 21 and 22 of the main housing 20 are exposed, the speaker device 33 and the large LCD 32 are ready for used in a game mode.

The operation of a sliding device for a dual sliding-type portable communication apparatus according to a second exemplary implementation of exemplary embodiments of the present invention will now be described in detail with reference to the exemplary embodiments of FIGS. 15 to 31.

Figure 15:
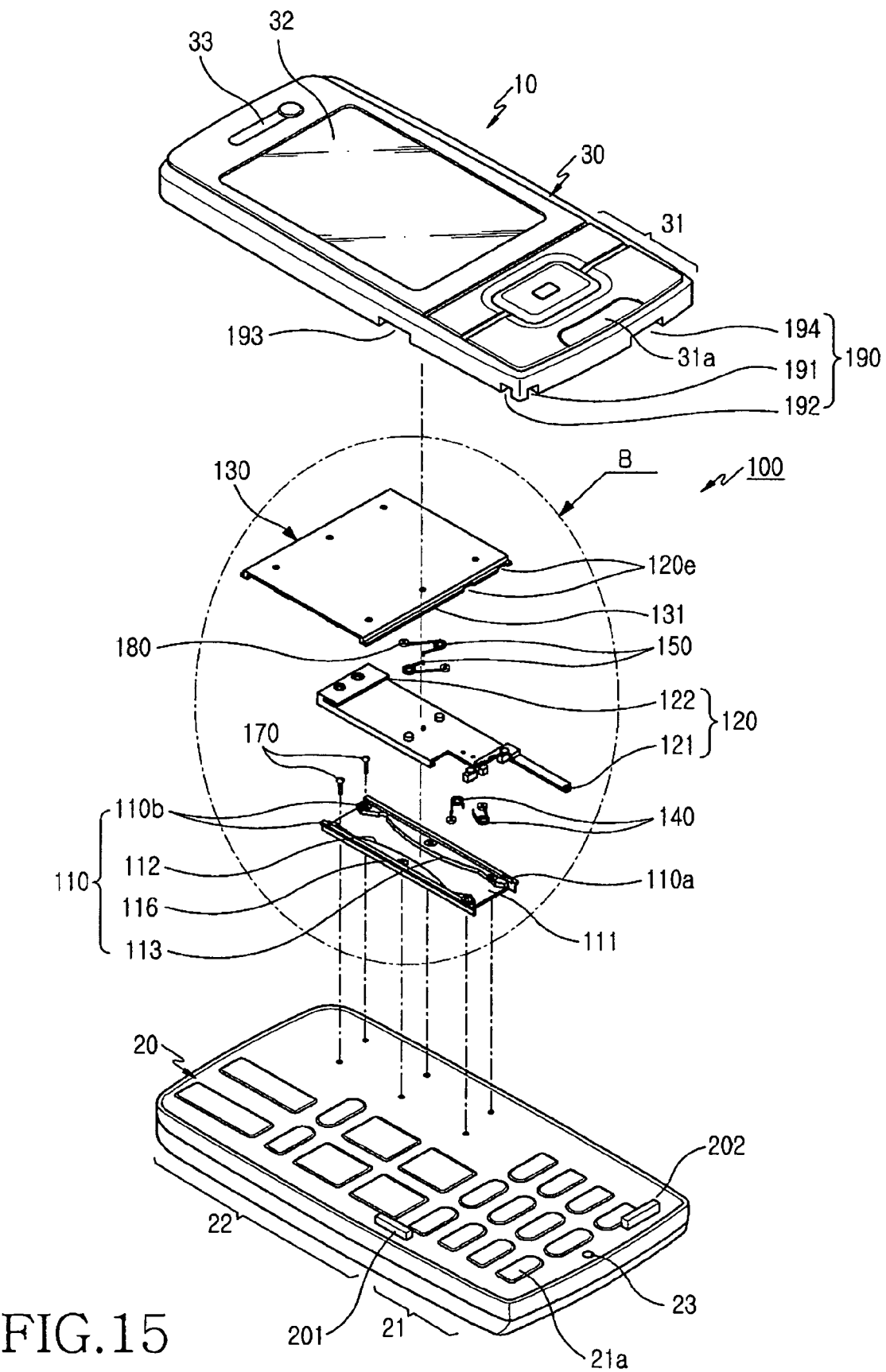
FIG. 15 is an exploded perspective view showing an example of the construction of a sliding device for a dual sliding-type portable communication apparatus according to another exemplary embodiment of the present invention.
Figure 16:
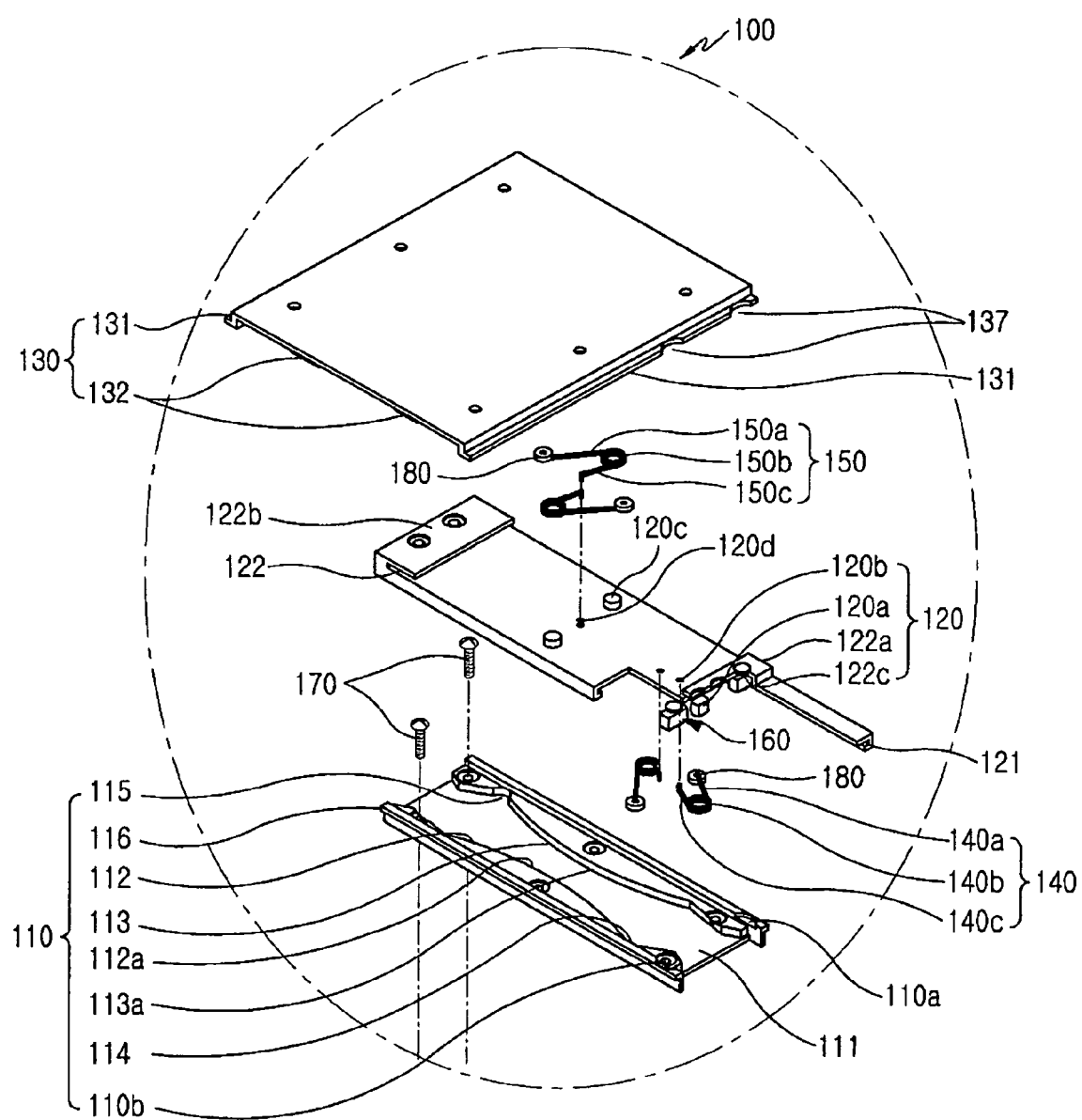
FIG. 16 is an exploded perspective view magnifying part B of FIG. 15.

As shown in the exemplary embodiments of FIGS. 15 and 16, the sliding device 100 for a dual sliding-type portable communication apparatus is provided with a base member 110, which has at least one screw fastening portion 110b formed thereon to be fastened to the main housing 20 by a screw 170.

Figure 17:
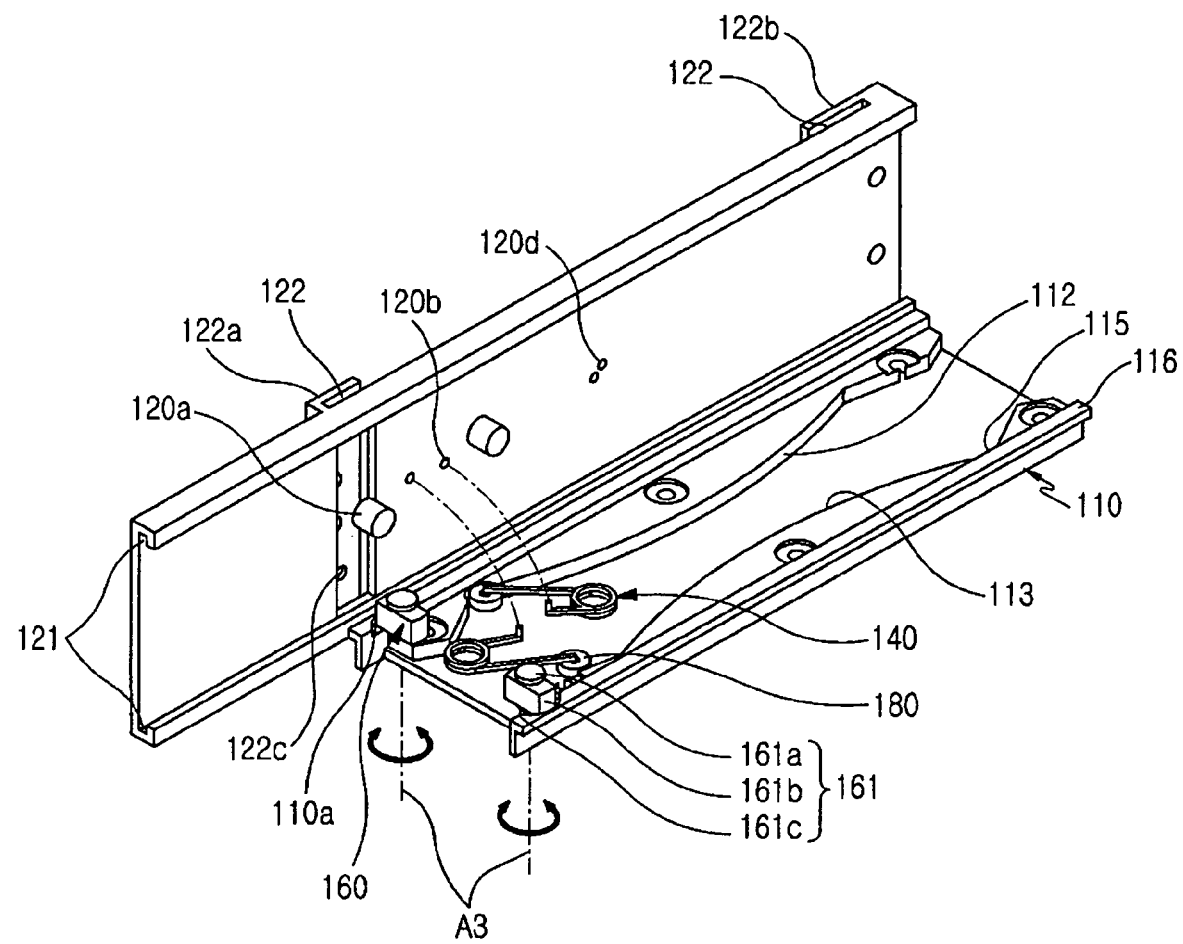
FIG. 17 is an exploded perspective view showing an example of a base member and a first sliding member of a sliding device for a dual sliding-type portable communication apparatus according to an embodiment of the present invention.

As shown in the exemplary embodiments of FIGS. 16 and 17, the base member 110 has a first sliding member 120 arranged, for example by lamination, on the upper portion thereof to semi-automatically slide the sliding housing 30 from the main housing 20 in the longitudinal direction A1. The first sliding member 120 has a first guide slot 121 formed on the lower portion thereof to be coupled to a base-side guide rib 116 formed on the base member 110 in such a manner that it can slide in the longitudinal direction A1. The base-side guide rib 116 is coupled to the first guide slot 121 in such a manner that it can slide in the longitudinal direction A1.

Figure 18:
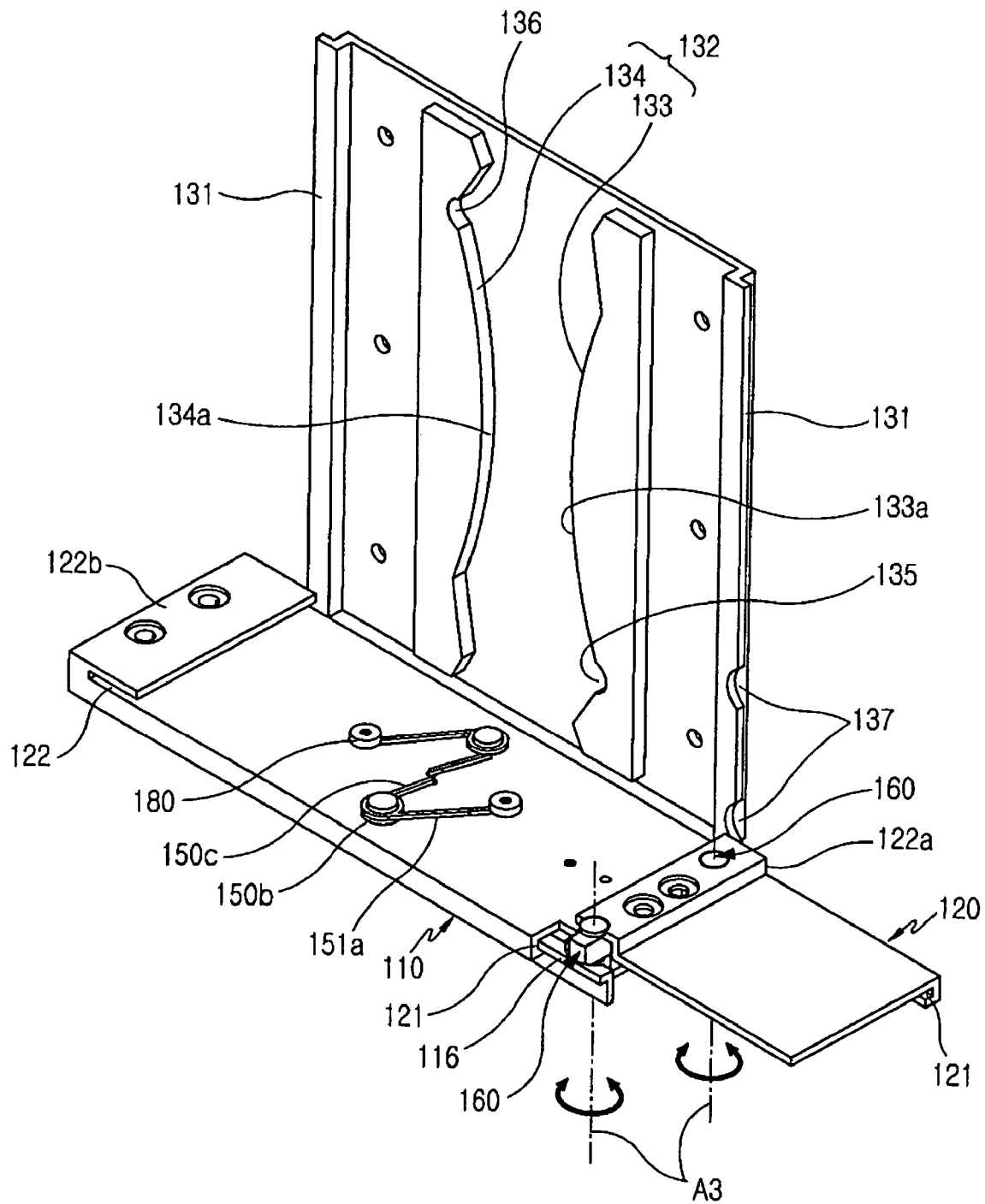
FIG. 18 is an exploded perspective view showing an example of first and second sliding members of a sliding device for a dual sliding-type portable communication apparatus according to an embodiment of the present invention.

As shown in the exemplary embodiments of FIGS. 16 and 18, the first sliding member 120 has a second sliding member 130 arranged, for example, by lamination, on the upper portion thereof to semi-automatically slide the sliding housing 30 from the main housing 20 in the perpendicular direction A2 to the longitudinal direction. The first sliding member 120 has a second guide slot 122 formed on the upper portion thereof to be coupled to a guide rib 131 formed on the second sliding member 130 in such a manner that it can slide in the perpendicular direction A2. The guide rib 131 of the second sliding member 130 is coupled to the second guide slot 122 in such a manner that it can slide in the perpendicular direction A2. The second guide slot comprises a first guide member formed in a predetermined position on the interior of the first sliding member in the perpendicular direction and a second guide member facing the first guide member while being substantially symmetrical to each other.

As shown in the exemplary embodiment of FIG. 17, a first force supply member 140 is positioned between the upper surface of the base member 110 and the lower surface of the first sliding member 120 to provide an elastic force so that the first sliding member 120 can slide semi-automatically in the longitudinal direction A1.

As shown in the exemplary embodiment of FIG, 18, a second force supply member 150 is positioned between the upper surface of the first sliding member 120 and the lower surface of the second sliding member 130 to provide an elastic force so that the second sliding member 130 can slide semi-automatically in the perpendicular direction A2.

Figure 20:
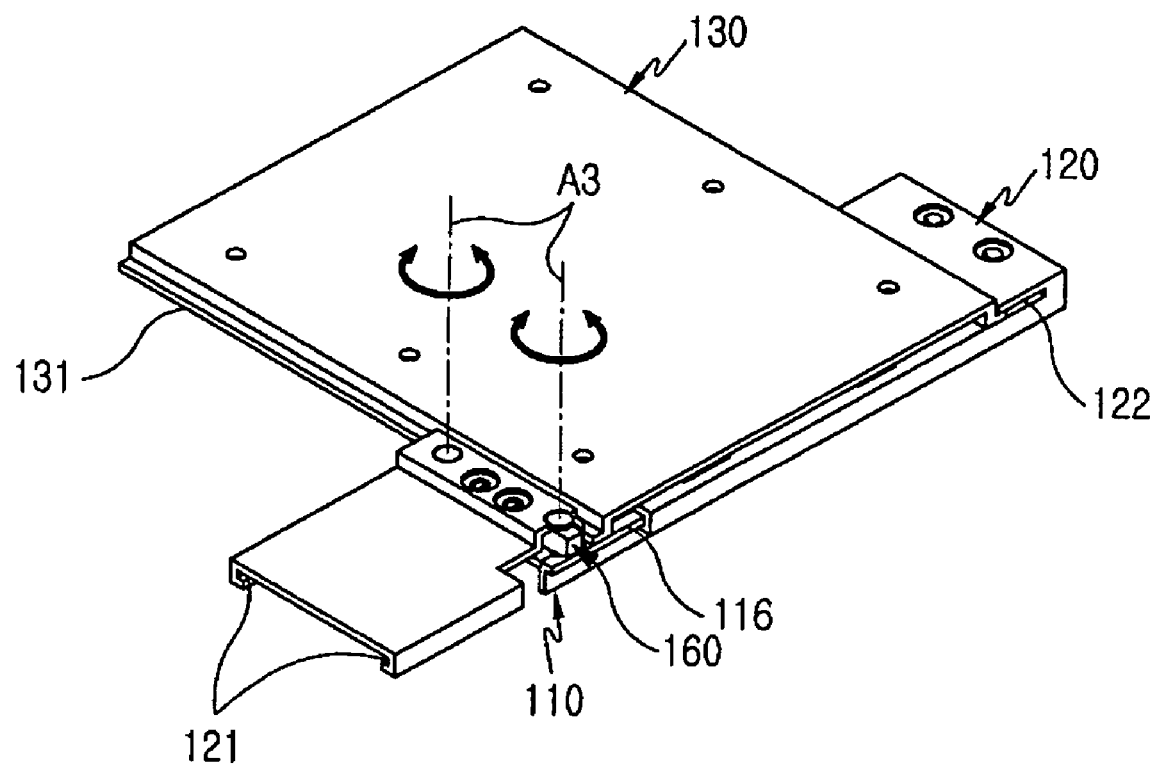
FIG. 20 is an assembled perspective view showing an example of a sliding device for a dual sliding-type portable communication apparatus according to an embodiment of the present invention.

As shown in the exemplary embodiments of FIGS. 17, 18, and 20, at least one stopper member 160 is positioned between each member 110, 120, and 130 and is adapted to be rotated and fastened/released, as each member 110, 120, and 130 slides, to restrict the first and second sliding members 120 and 130 in such a manner that they can independently slide in the longitudinal and perpendicular directions A1 and A2, respectively. The stopper member 160 includes a rotation stopper unit 161 adapted to slide and rotate, as the first and second sliding members 120 and 130 slide, to restrict the sliding movement of the first and second sliding members 120 and 130.

As shown in the exemplary embodiment of FIG. 15, the second sliding member 130 is restricted by the sliding housing 30. As shown in the exemplary embodiments of FIGS. 16 and 17, the base member 110 has a groove formed therein to accommodate the first force supply member 140 and a sliding movement unit 111 formed thereon to semi-automatically slide the first sliding member 120 in the longitudinal direction A1 or restrict it. The sliding movement unit 111 has first and second guide surfaces 112 and 113 formed thereon to guide the first force supply member 140. As shown in the exemplary embodiments of FIGS. 21 to 26, the sliding housing 30 slides away from the main housing 20 in the longitudinal direction A1. The rotation stopper unit 161 has a hinge unit 161a formed on the upper end thereof to be coupled to a rotation unit 122c of the first sliding member 120 in such a manner that it can rotate about a hinge axis A3. As shown in the exemplary embodiments of FIGS. 21 and 22, the hinge unit 161a has a rotation locker unit 161b formed on the lower portion thereof, which is adapted to rotate as the first and second sliding members 120 and 130 slide. As the first sliding member 120 slides, the rotation locker unit 161b moves together. Upon contacting a latching groove 110a formed on the base member 110, the rotation locker unit 161b is released and rotated about the hinge axis A3. At the same time, the rotation locker unit 161b is inserted into a semi-spherical groove 137 of the second sliding member 130, as shown in the exemplary embodiment of FIG. 22.

Figure 22:
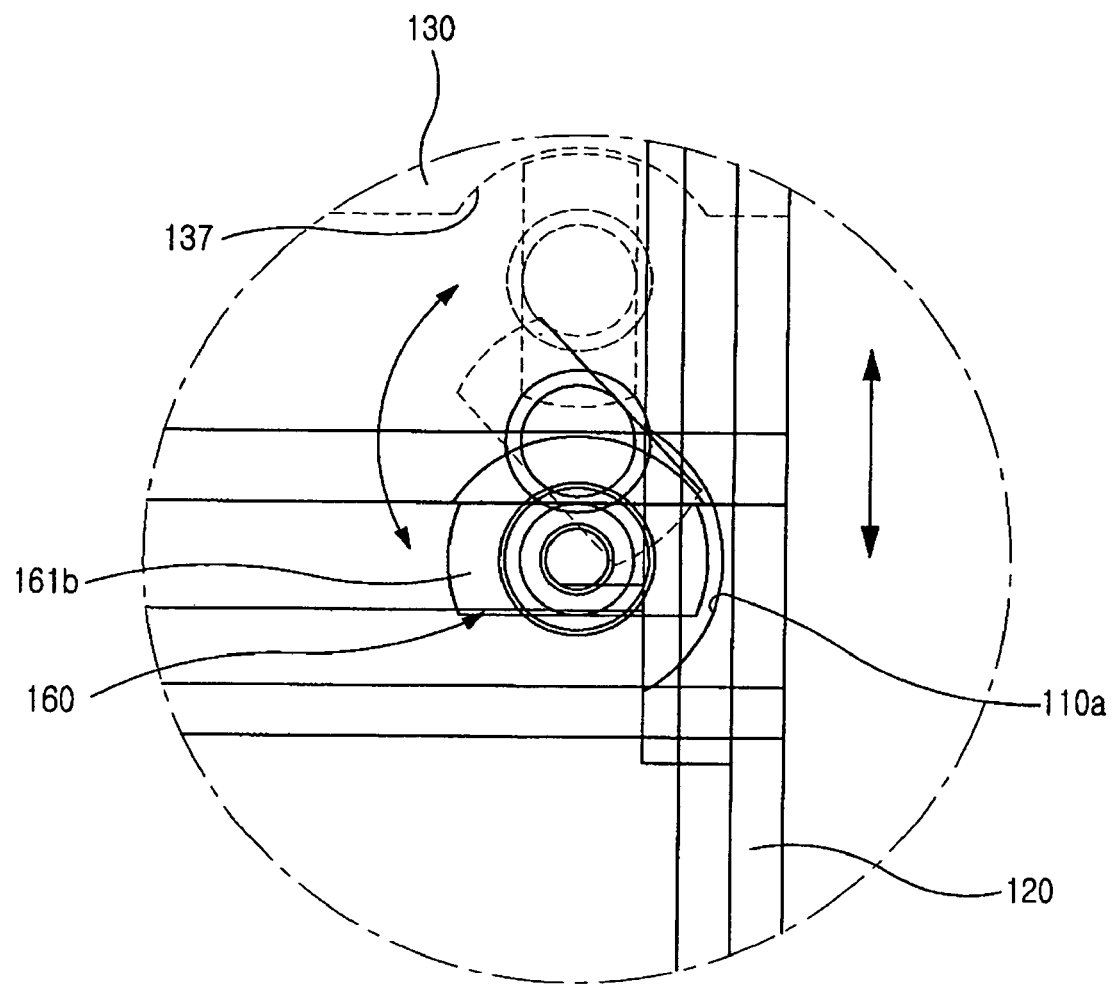
FIG. 22 is a top view magnifying part C of FIG. 21.
Figure 24:
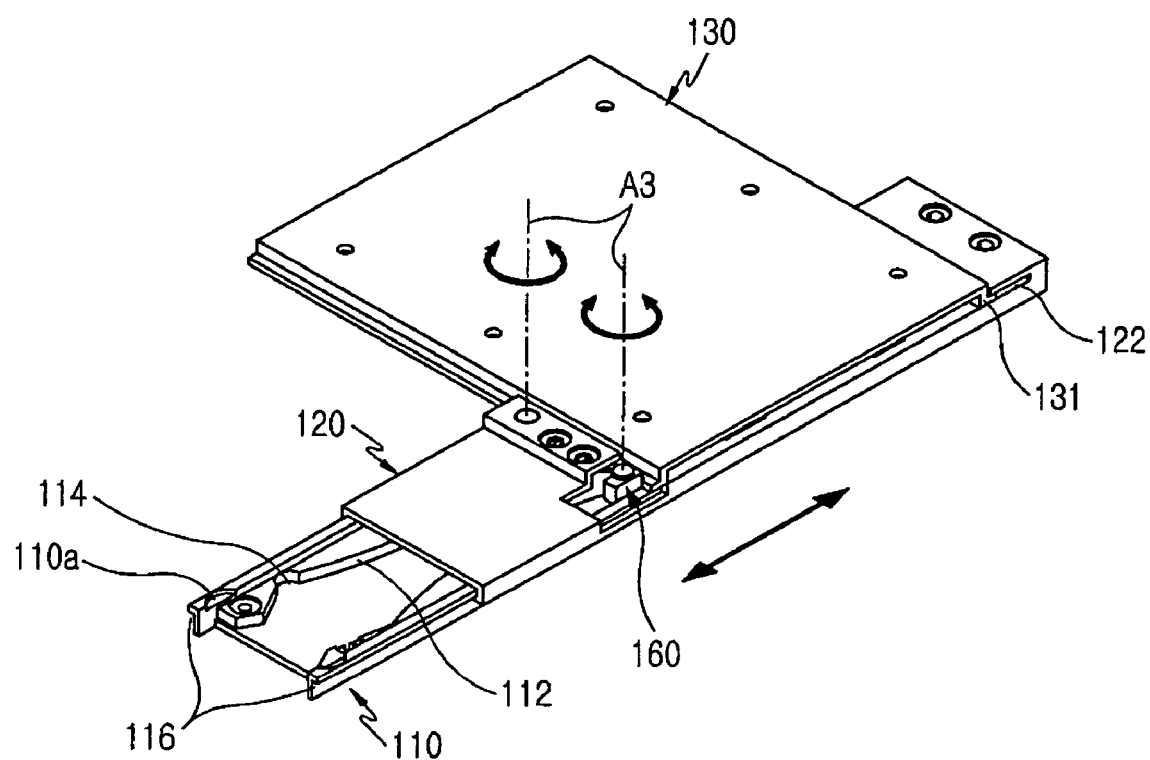
FIG. 24 is a perspective view showing an example of a sliding device for a dual sliding-type portable communication apparatus according to an embodiment of the present invention, after it has slid in the longitudinal direction.
Figure 25:
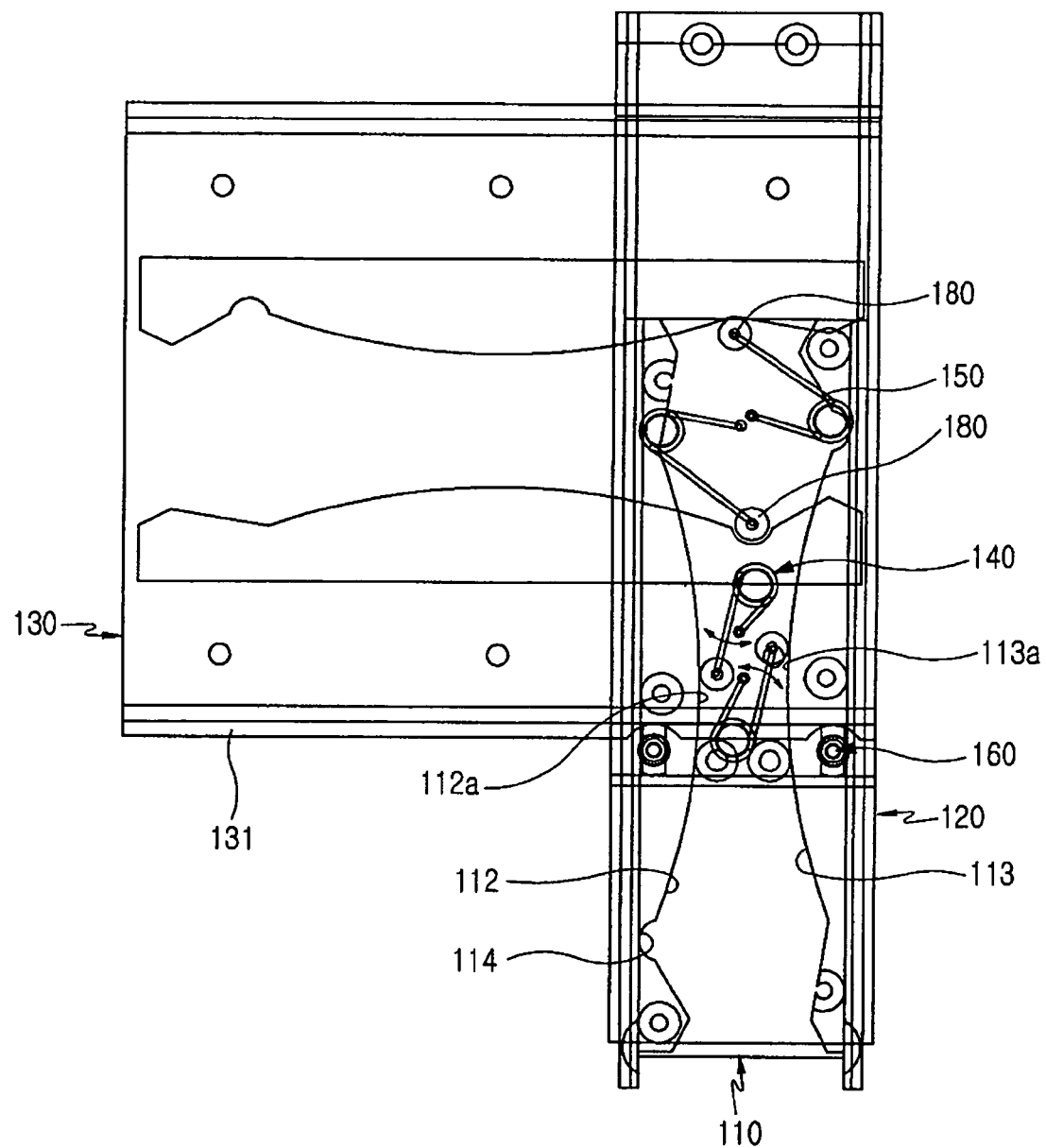
FIG. 25 is a top view showing an example of a sliding device for a dual sliding-type portable communication apparatus according to an embodiment of the present invention, which is in the process of moving in the longitudinal direction.

As shown in the exemplary embodiments of FIGS. 22, 24, and 25, the rotation locker unit 161b rotates about the hinge axis A3 and is positioned in a line in longitudinal direction A1. Then, the rotation locker unit 161b is released from the latching groove 110a of the base member 110 and allows the first sliding member 120 to slide in the longitudinal direction A1. As the rotation locker unit 161b is inserted into the semi-spherical groove 137 of the second sliding member 130, the sliding movement of the second sliding member is restricted while restriction of the first sliding member is released. Upon rotating and being positioned in a line in the longitudinal direction, the rotation locker unit 161b contacts the inner surface of the guide rib 116 of the base member 110 in such a manner that it can slide.

As shown in the exemplary embodiment of FIG. 17, the rotation locker unit 161b has a sliding guide unit 161c formed on the lower portion thereof to guide the sliding movement thereof.

Figure 26:
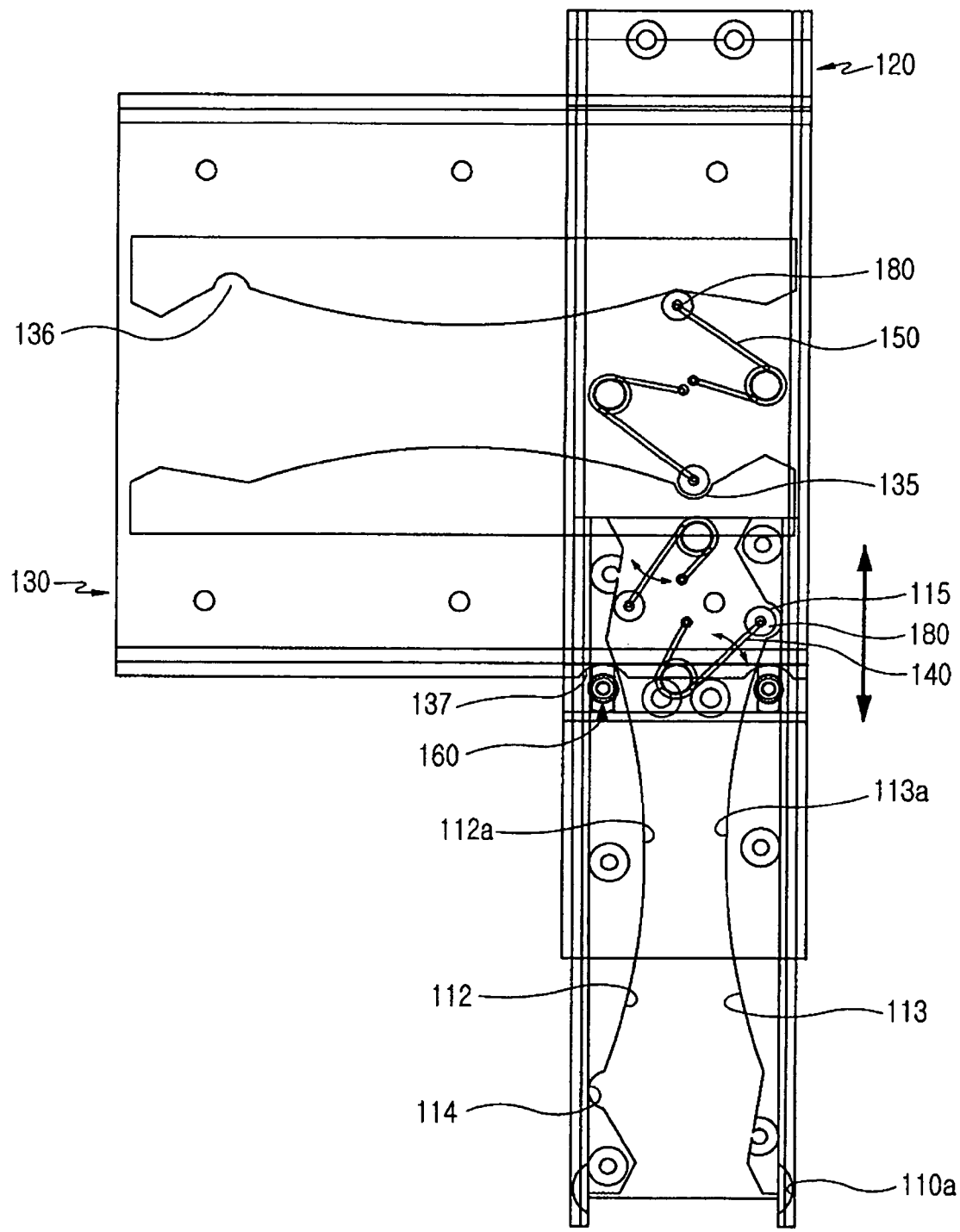
FIG. 26 is a top view showing an example of a sliding device for a dual sliding-type portable communication apparatus according to an embodiment of the present invention, after it has slid in the longitudinal direction.

As shown in the exemplary embodiments of FIGS. 25 and 26, the first guide surface 112 has a first stopper groove 114 formed on an end thereof. A roller unit 180 provided on the first force supply member 140 is inserted into the first stopper groove 114. According to the sliding movement, the roller unit 180 is released from the first stopper groove 114 and moves along the first guide surface 112. Another roller unit 180 of the first force supply member 140 moves along the second guide surface 113.

As shown in the exemplary embodiment of FIG. 25, the first and second guide surfaces 112 and 113 are symmetric to each other and become narrower towards the center, at which first and second points of curvature 112a and 113a are established, respectively. They become wider again past the first and second points of curvature 112a and 113a, which define corresponding curves.

As shown in the exemplary embodiment of FIG. 26, the second guide surface 113 has a second stopper groove 115 formed on an end thereof to restrict the sliding movement of the first sliding member 120 in the final position. As the roller unit 180 moves along the second guide surface 113 and is inserted into the second stopper groove 115, the first sliding member 120 stops sliding in the final position.

As shown in the exemplary embodiments of FIGS. 16 and 17, the first force supply member 140 comprises a pair of torsion springs. An end of each torsion spring 140 is configured as a free end 140a, which is adapted to move along the first and second guide surfaces 112 and 113 of the sliding movement unit 111 and rotate to provide an elastic force. The central portion 140b of each torsion spring 140 is coupled to a spring support protrusion 120a protruding from the lower end surface of the first sliding member 120. The other end of each torsion spring 140 is configured as a fixed end 140c, which is coupled to a hole 120b formed on the first sliding member 120. The roller unit 180 is mounted on the free end 140a.

Figure 23:
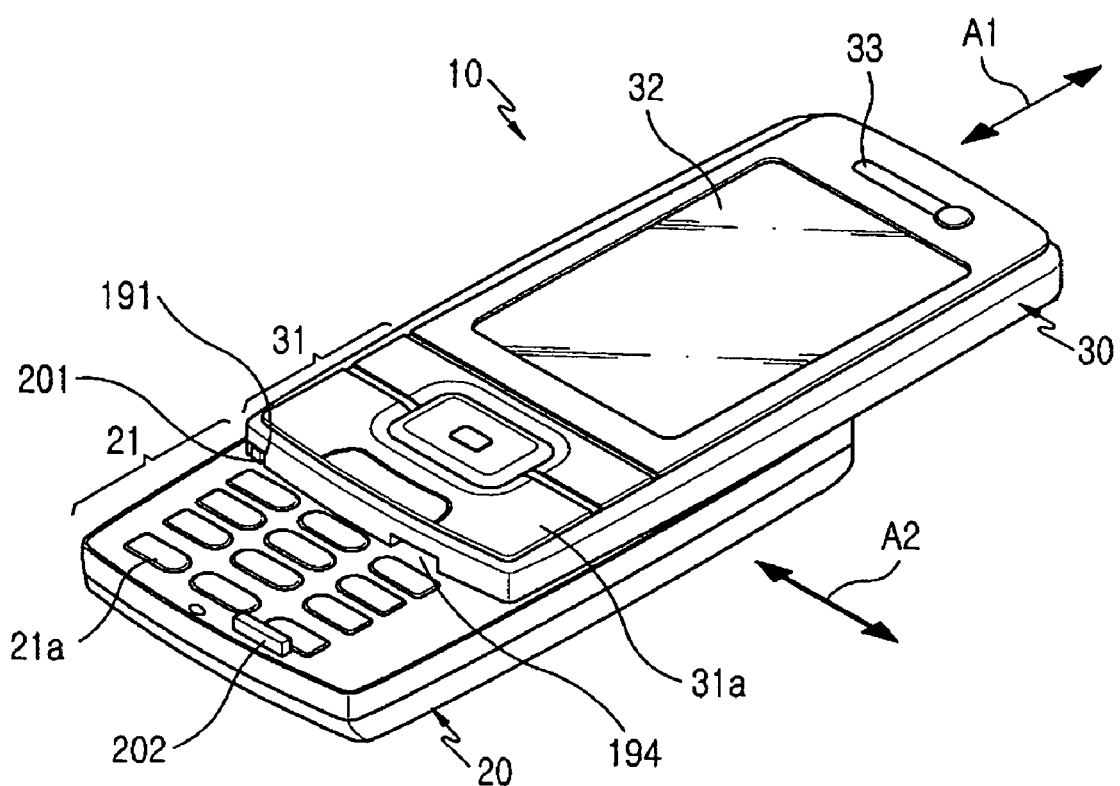
FIG. 23 is a perspective view showing an example of a dual sliding-type portable communication apparatus according to an embodiment of the present invention, after its sliding housing has slid in the longitudinal direction.

As shown in the exemplary embodiments of FIGS. 15 and 23, the main housing 20 and the sliding housing 30 are provided with a locking means 190 to guide the independent sliding movement of the sliding housing 30 from the main housing 20 in the longitudinal direction A1 and in the perpendicular direction A2, as well as to lock and restrict it. The locking member 190 includes first and second locking members 191 and 192. When the sliding housing 30 slides in the longitudinal direction A1, as shown in the exemplary embodiment of FIG. 23, the first locking member 191 inserted into a first latching protrusion 201 formed on the upper surface of the main housing 20 and is restricted by it. Then, the sliding movement of the sliding housing 30 in the perpendicular direction A2 is restricted.

When the first locking member 191 is inserted into the first latching protrusion 201, as shown in the exemplary embodiment of FIG. 23, a second latching protrusion 202 is guide-released from a second guide coupling unit 194. The first locking member 191 and the second guide coupling unit 194 are positioned on the sliding housing 30.

When the sliding housing 30 is to be slid again towards the main housing 20 in the longitudinal direction A1, as shown in the exemplary embodiments of FIGS. 17, 19, 20, 21, and 22, the sliding housing 30 slides in the opposite direction to the longitudinal direction A1. The roller unit 180 of the free end 140a is released from the second stopper groove 115 and moves along the second guide surface 113. At the same time, the roller unit 180 of the other free end of the torsion spring 140 moves along the first guide surface 112.

Figure 21:
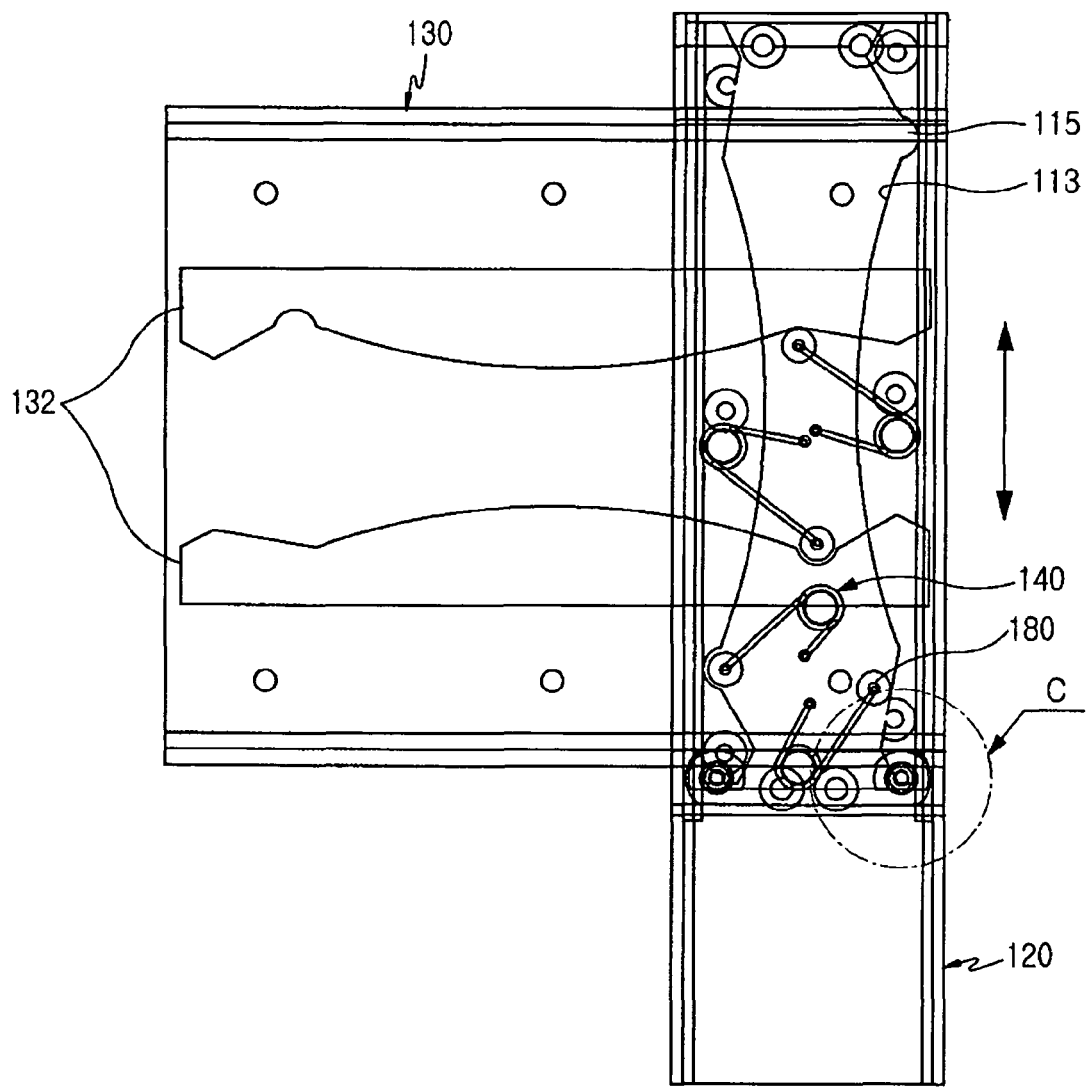
FIG. 21 is a top view showing an example of a sliding device for a dual sliding-type portable communication apparatus, before operation, according to an embodiment of the present invention.

As shown in the exemplary embodiments of FIGS. 17 and 21, the torsion spring 140 travels again along the points of curvature 112a and 113a of the first and second guide surfaces 112 and 113, respectively, and provides an elastic force. As the roller unit 180 is again inserted into the first stopper groove 114 of the first guide surface 112, the first sliding member 120 and the rotation locker unit 161b stop in the initial position.

Figure 19:
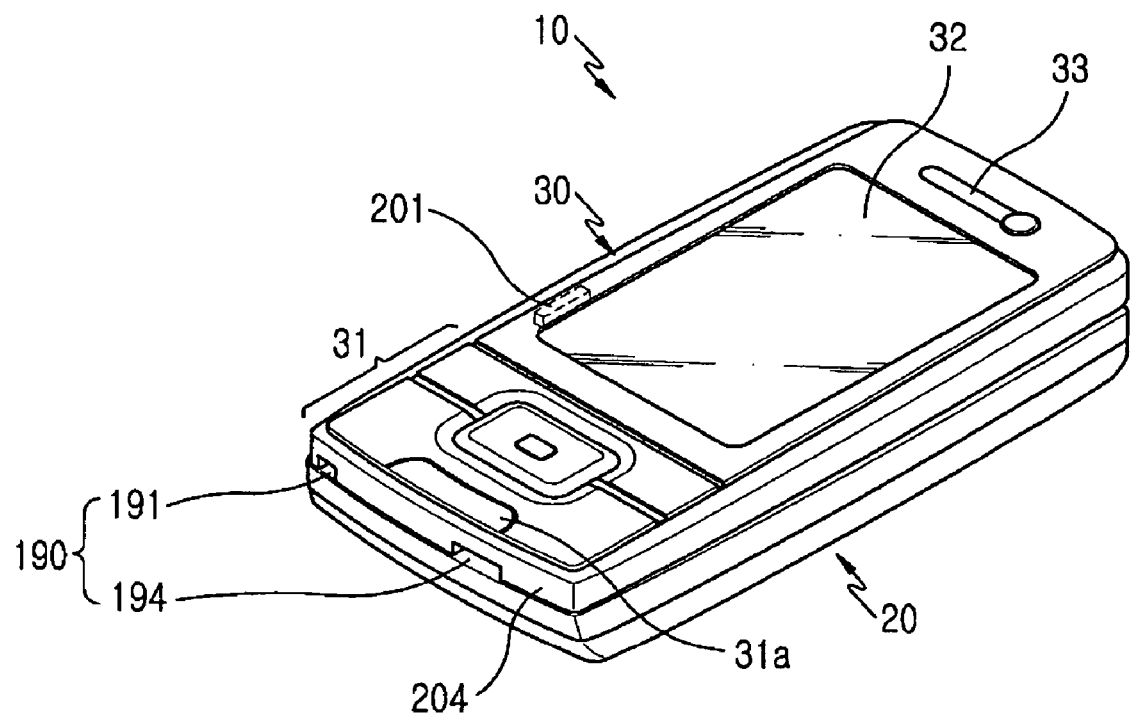
FIG. 19 is a perspective view showing an example of a sliding device for a dual sliding-type portable communication apparatus, before operation, according to an embodiment of the present invention.

As shown in the exemplary embodiment of FIG. 19, the sliding housing 30 has first and second guide coupling units 193 and 194 to be guide-coupled to the first and second latching protrusions 201 and 202, respectively. When the sliding housing 30 slides to the original position, the first and second guide coupling units 193 and 194 are guide-coupled to the first and second latching protrusions 201 and 202, respectively.

Figure 27:
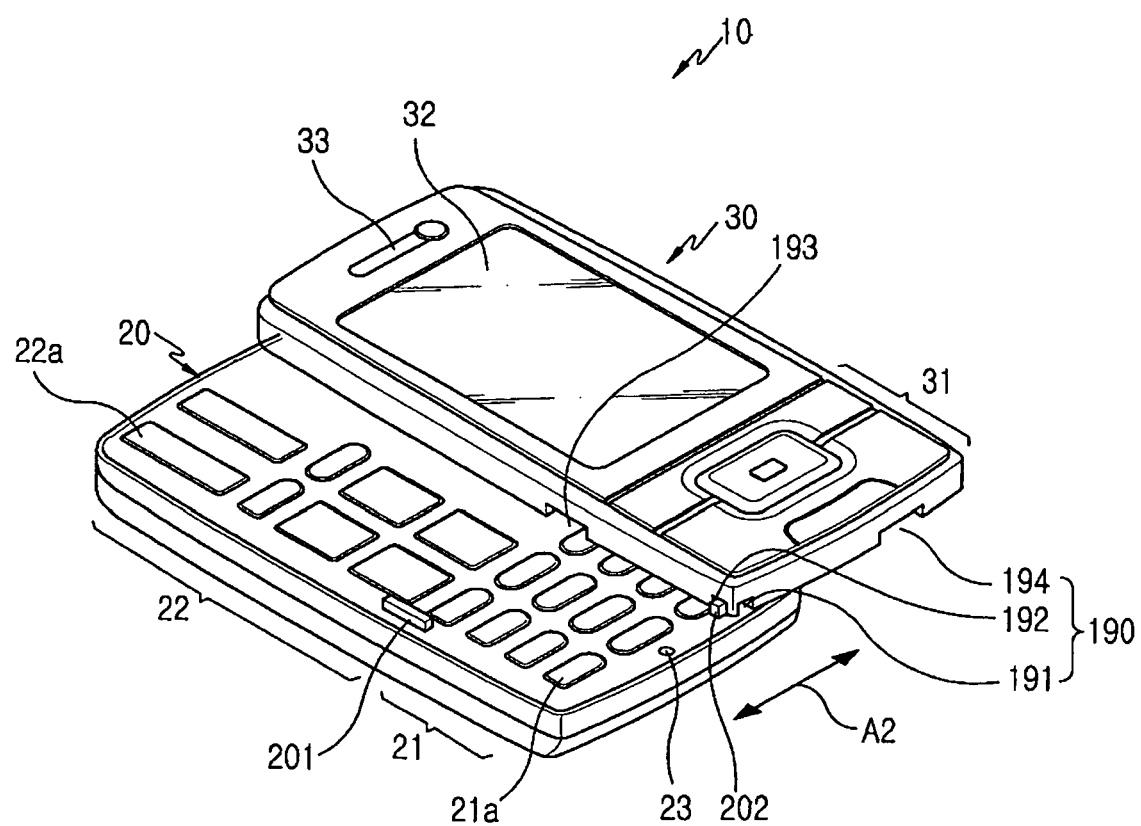
FIG. 27 is a perspective view showing an example of a dual sliding-type portable communication apparatus according to an embodiment of the present invention, after its sliding housing has slid in a direction perpendicular to the longitudinal direction.
Figure 28:
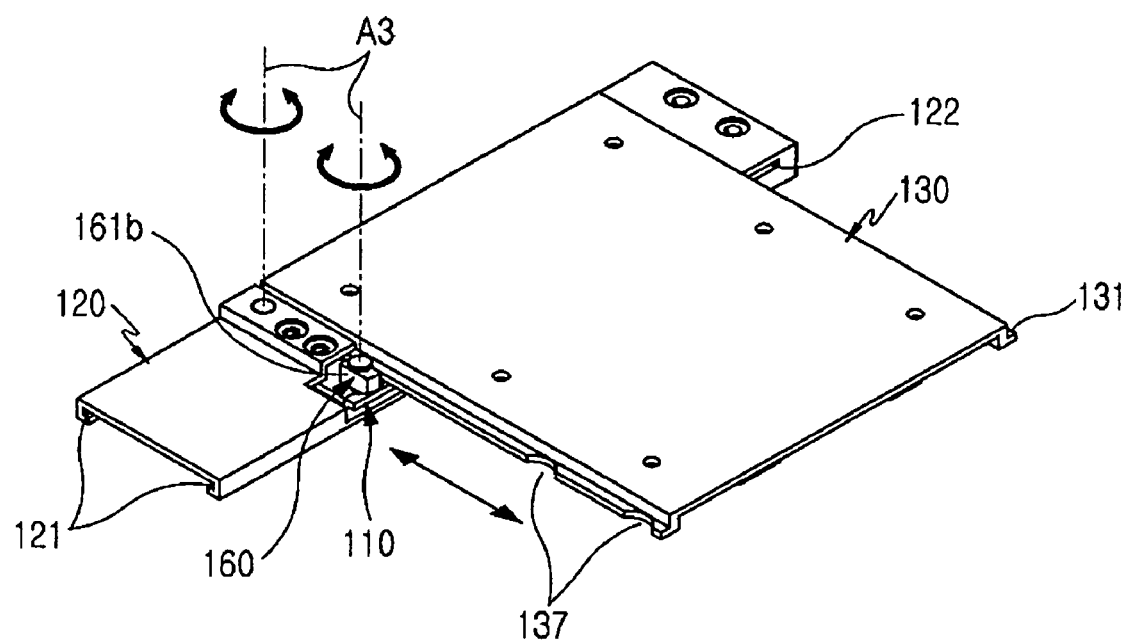
FIG. 28 is a perspective view showing an example of a sliding device for a dual sliding-type portable communication apparatus according to an embodiment of the present invention, after it has slid in a direction perpendicular to the longitudinal direction.
Figure 29:
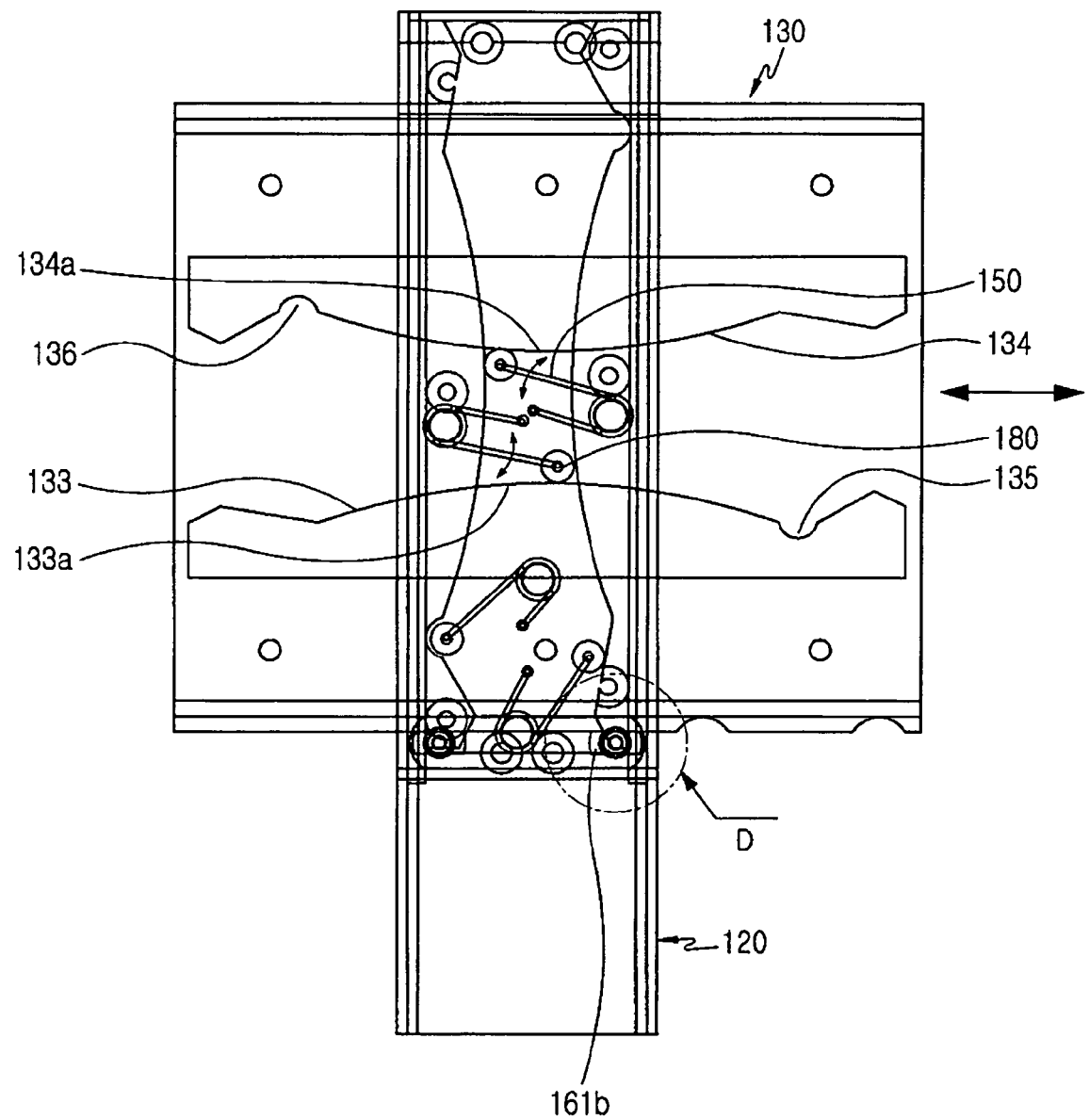
FIG. 29 is a top view showing an example of a sliding device for a dual sliding-type portable communication apparatus according to an embodiment of the present invention, which is in the process of moving in a direction perpendicular to the longitudinal direction.

When the sliding housing 30 is slid away from the main housing 20 in the perpendicular direction A2, as shown in the exemplary embodiments of FIGS. 27-29, the rotation locker unit 161b of the rotation stopper unit 161 slides together and is released from the semi-spherical groove 137 of the second sliding member 130. In addition, the rotation locker unit 161b rotates about the hinge axis A3 of the hinge unit 161a and is inserted into the latching groove 110a of the base member 110.

Figure 30:
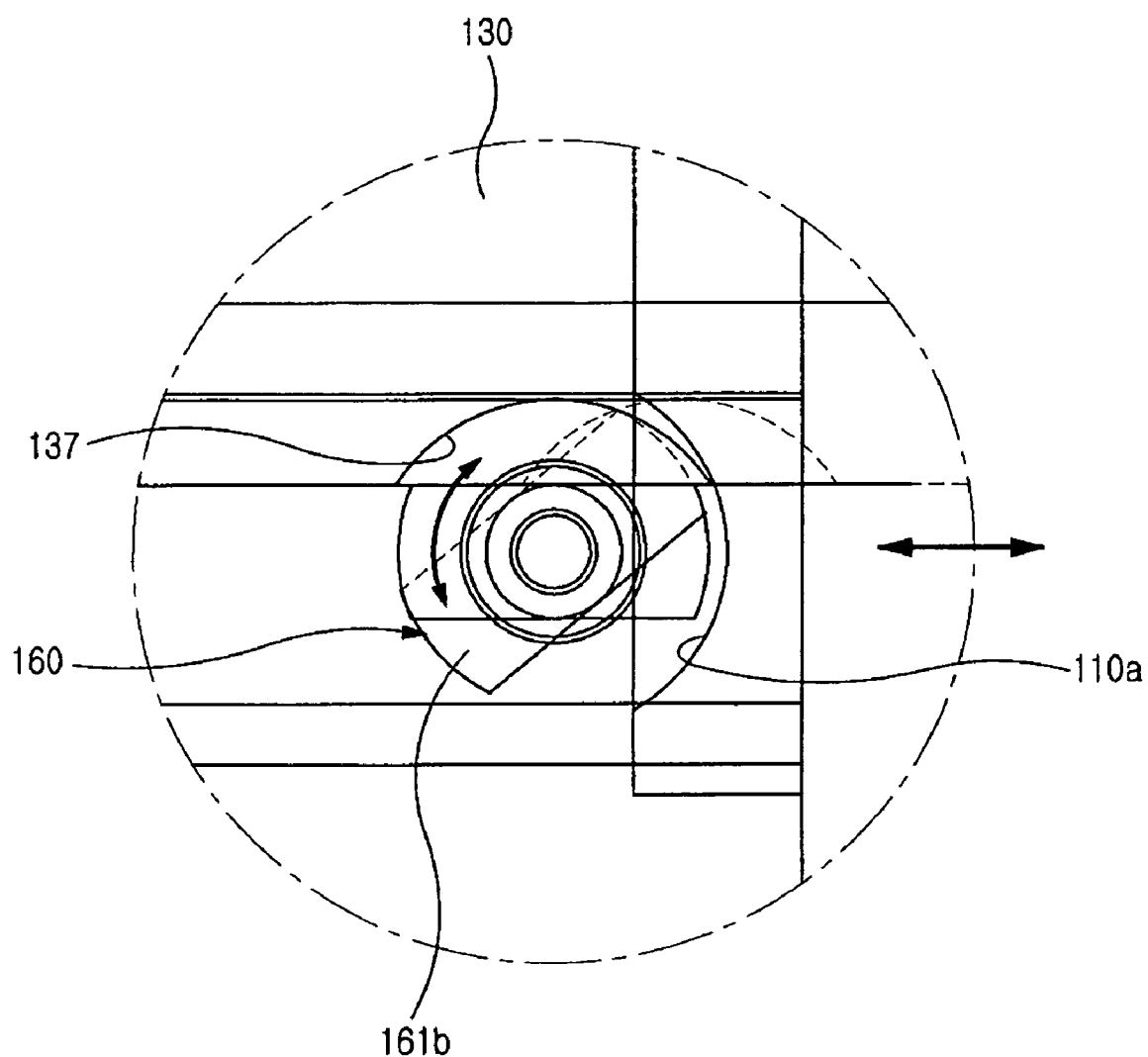
FIG. 30 is a top view magnifying part D of FIG. 29.

As shown in the exemplary embodiments of FIGS. 29 and 30, the rotation locker unit 161b rotates about the hinge axis A3 and is positioned in a line in the perpendicular direction A2 to enable the second sliding member 130 to slide in the perpendicular direction A2. Furthermore, the rotation locker unit 161b contacts the sliding-side guide rib 131 of the second sliding member 130 while being able to slide.

Figure 31:
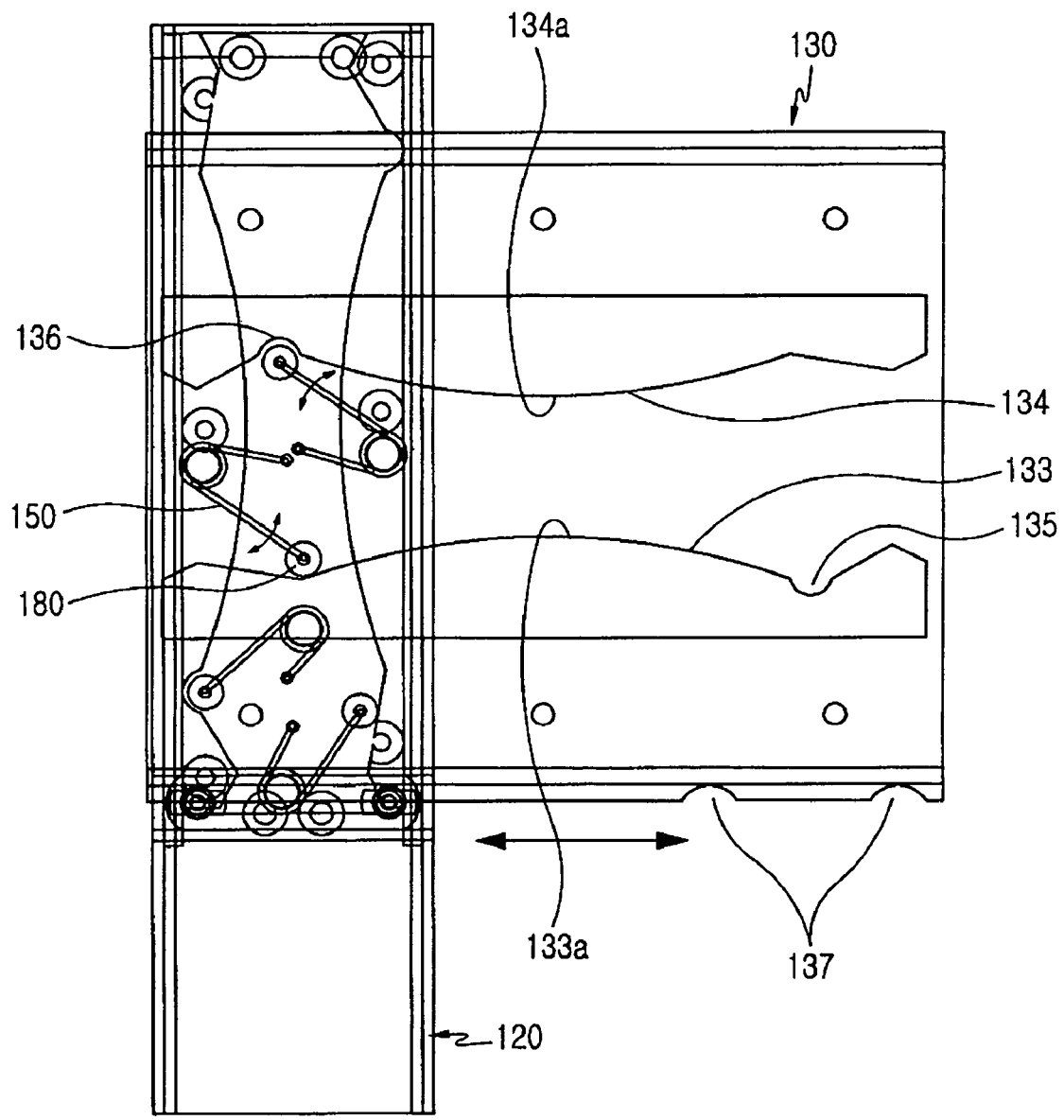
FIG. 31 is a top view showing an example of a sliding device for a dual sliding-type portable communication apparatus according to an embodiment of the present invention, after it has slid in a direction perpendicular to the longitudinal direction.

As shown in the exemplary embodiments of FIGS. 30 and 31, the rotation locker unit 161b releases the restriction so that the second sliding member 130 can slide in the perpendicular direction A2. As the second sliding member 130 slides in the perpendicular direction A2, the sliding-side guide rib 131 slides along the second guide slot 122. As shown in the exemplary embodiments of FIGS. 29 and 31, the second sliding member 130 has, on its lower surface, a second force supply member 150 and a sliding rib 132 adapted to semi-automatically slide the second sliding member 130 in the perpendicular direction A2 or restrict its movement. The sliding rib 132 has first and second rib-side guide surfaces 133 and 134 formed thereon to guide the second force supply member 150.

As shown in the exemplary embodiment of FIG. 29, the first rib-side guide surface 133 has a first rib-side stopper groove 135 formed thereon, into which the roller unit 180 provided on the second force supply member 150 is inserted. According to the sliding movement in the perpendicular direction A2, the roller unit 180 is released from the first rib-side stopper groove 135 and moves along the first guide surface 133.

The other roller unit 180 of the second force supply member 150 moves along the second rib-side guide surface 134. The first and second rib-side guide surfaces 133 and 134 are symmetric to each other and become narrower towards the center, at which first and second points of curvature 133a and 134a are established, respectively. They become wider again past the first and second points of curvature 133a and 134a, which define corresponding curves.

As shown in the exemplary embodiment of FIG. 31, the second rib-side guide surface 133 has a second rib-side stopper groove 136 formed on an end thereof to restrict the sliding movement of the second sliding member 130 in the final position. As the roller unit 180 moves along the second rib-side guide surface 134 and is inserted into the second rib-side stopper groove 136, the second sliding member 130 stops sliding in the final position.

As shown in the exemplary embodiments of FIGS. 16 and 18, the second force supply member 150 comprises a pair of torsion springs. An end of each torsion spring 150 is configured as a free end 150a, which is adapted to move along the first and second rib-side guide surfaces 134 and 134 of the sliding rib 132 and rotate to provide an elastic force. The central portion 150b of each torsion spring 150 is coupled to a spring support protrusion 120c protruding from the lower end surface of the second sliding member 130. The other end of each torsion spring 150 is configured as a fixed end 150c, which is coupled to a hole 120d formed on the first sliding member 120. The roller unit 180 is mounted on the free end 150a.

When the sliding housing 30 slides in the perpendicular direction A2, as shown in the exemplary embodiment of FIG. 27, the second locking member 192 of the locking member 190 is inserted into a second latching protrusion 202 formed on the upper surface of the main housing 20 and is locked by it to restrict the sliding movement of the sliding housing 30 in the longitudinal direction A1. As the second locking member 192 is inserted into the second latching protrusion 202, the first latching protrusion 201 is guide-released from the first guide coupling unit 193. The second locking member 192 and the first guide coupling unit 193 are positioned on the sliding housing 30.

The operation of a sliding device for a dual sliding-type portable communication apparatus according to a third exemplary implementation of exemplary embodiments of the present invention will now be described in detail with reference to FIGS. 32 to 38.

Figure 32:
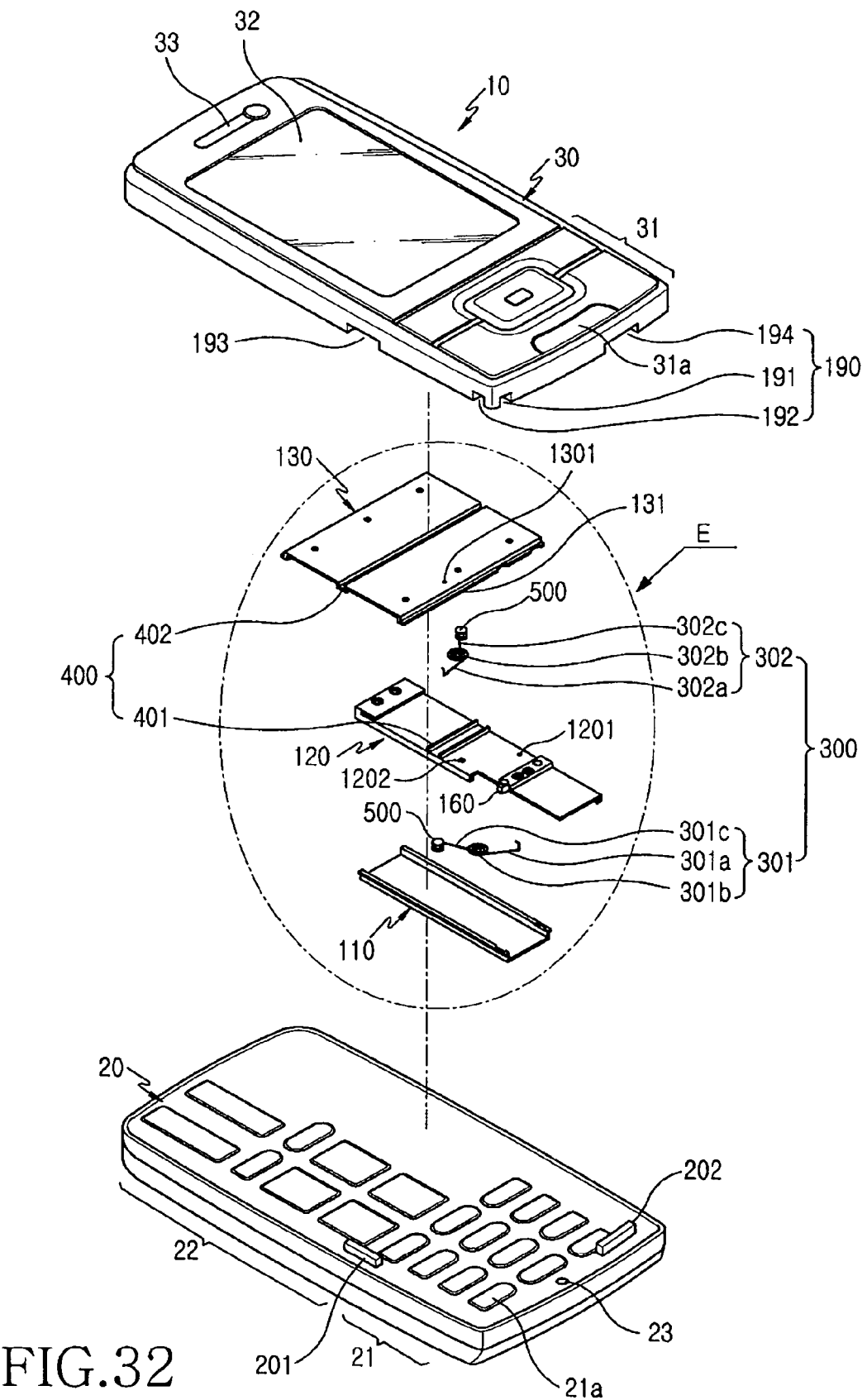
FIG. 32 is an exploded perspective view showing an example of the construction of a sliding device for a dual sliding-type portable communication apparatus according to a third embodiment of the present invention.
Figure 33:
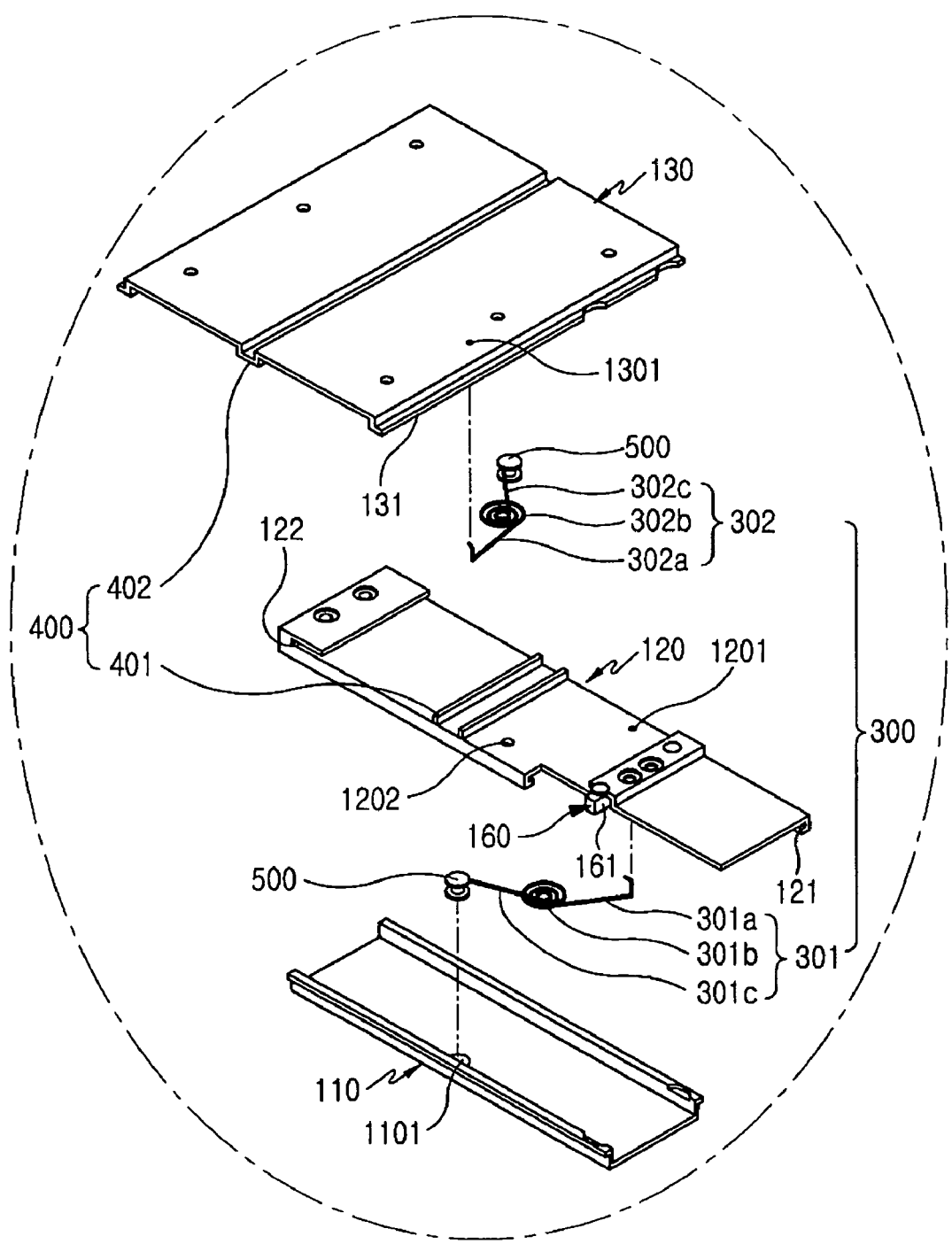
FIG. 33 is an exploded perspective view magnifying part E of FIG. 32.

As shown in the exemplary embodiments of FIGS. 32 and 33, the sliding device has a base member 110 fastened to the main housing 20 by screws and a first sliding member 120 arranged, for example by lamination, on the upper portion of the base member 110 to semi-automatically slide the sliding housing 30 from the main housing 20 in the longitudinal direction A1. The first sliding member 120 has a second sliding member 130 arranged, for example by lamination, on the upper portion thereof to semi-automatically slide the sliding housing 30 from the main housing 20 in the perpendicular direction A2 to the longitudinal direction A1. The first sliding member 120 has a second guide slot 122 formed on the upper portion thereof to be coupled to a guide rib 131 formed on the second sliding member 130 in such a manner that it can slide in the perpendicular direction A2. The guide rib 131 of the second sliding member 130 is coupled to the second guide slot 122 in such a manner that it can slide in the perpendicular direction A2.

As shown in the exemplary embodiments of FIGS. 32 and 33, an elastic member 300 is positioned between each member 110, 120, and 130 to provide an elastic force so that the first and second sliding members 120 and 130 can slide semi-automatically. The elastic member 300 includes first and second spring members 301 and 302. As shown in the exemplary embodiment of FIG. 33, the first spring member 301 is positioned between the base member 110 and the first sliding member 120. The second spring member 302 is positioned between the first sliding member 120 and the second sliding member 130. The first spring member 301 provides an elastic force so that the first sliding member 120 can slide semi-automatically in the longitudinal direction A1. The second spring member 302 provides an elastic force so that the second sliding member 130 can slide semi-automatically in the perpendicular direction A2.

Figure 34:
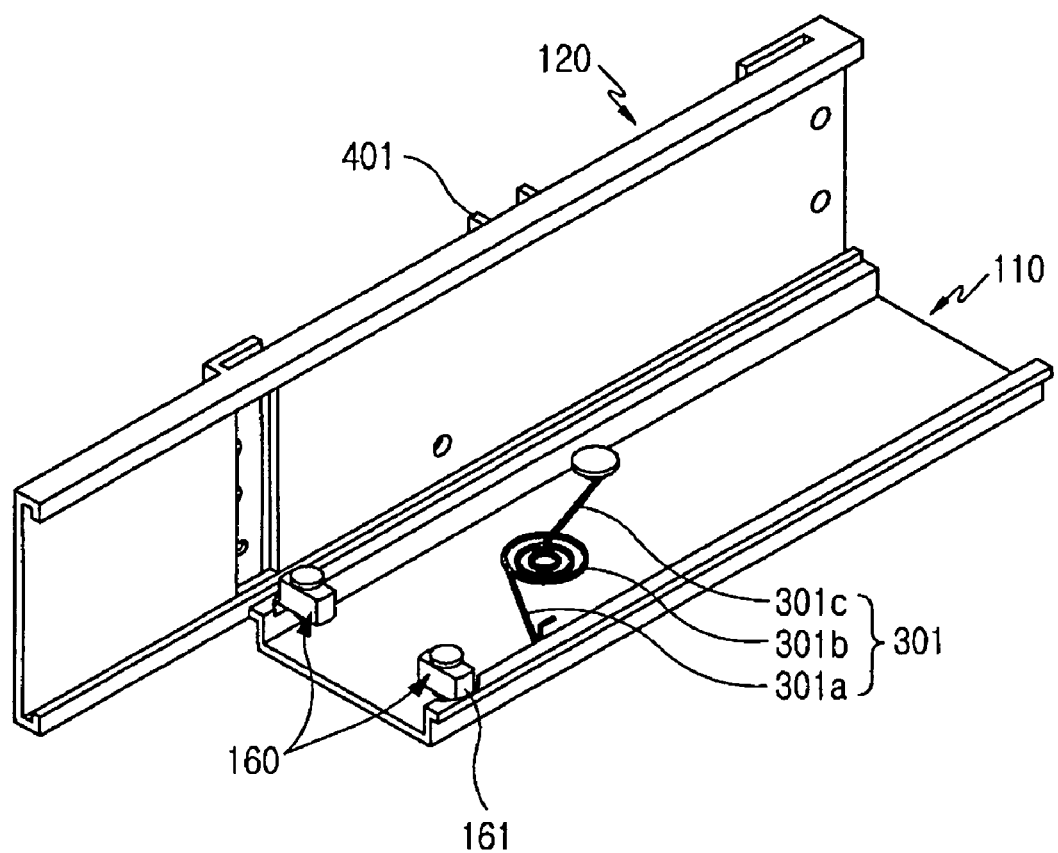
FIG. 34 is an exploded perspective view showing an example of a base member and a first sliding member of a sliding device for a dual sliding-type portable communication apparatus according to an embodiment of the present invention.

As shown in the exemplary embodiment of FIG. 34, at least one stopper member 160 is positioned between each of the base member 110 and the first and second sliding members 120 and 130 and is adapted to be rotated and fastened/released, as each member 110, 120, and 130 slides, to restrict the first and second sliding members 120 and 130 in such a manner that they can independently slide in the longitudinal and perpendicular directions A1 and A2, respectively. The stopper member 160 includes a rotation stopper unit 161 adapted to slide and rotate, as the first and second sliding members 120 and 130 slide, to restrict the sliding movement of the first and second sliding members 120 and 130.

The operation of the stopper member 160 is the same as has been described with regard to the sliding device for a dual sliding-type portable communication apparatus according to the second exemplary implementation of the present invention and a description thereof will be omitted for clarity and conciseness.

Figure 37:
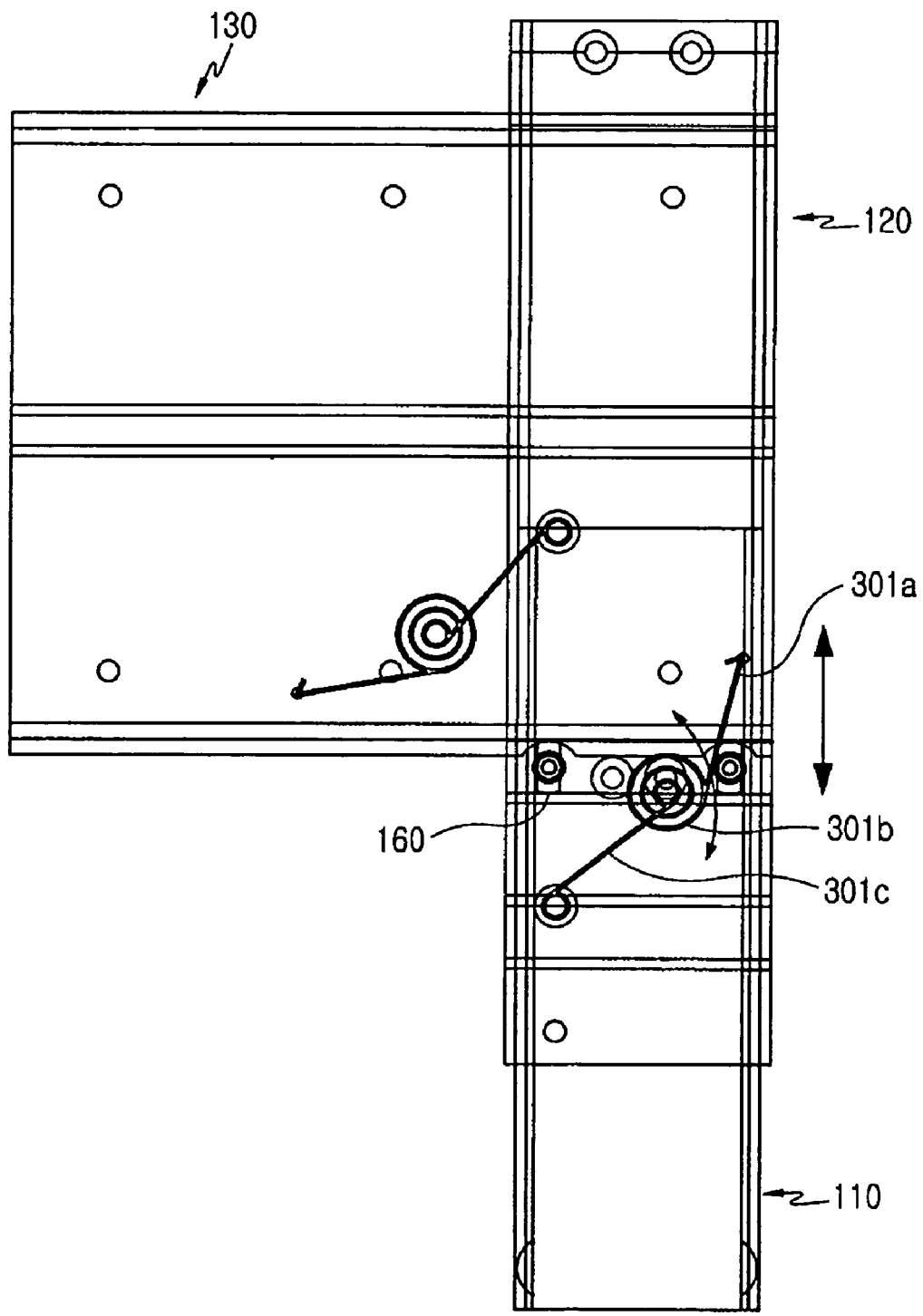
FIG. 37 is a top view showing a sliding device for an example of a dual sliding-type portable communication apparatus according to an embodiment of the present invention, after it has slid in the longitudinal direction.

When the sliding housing 30 slides away from the main housing 20, as shown in the exemplary embodiment of FIG. 37, the first sliding member 120 slides together. Particularly, the first sliding member 120 slides in the longitudinal direction A1 via the elastic force from the first spring member 301.

Figure 36:
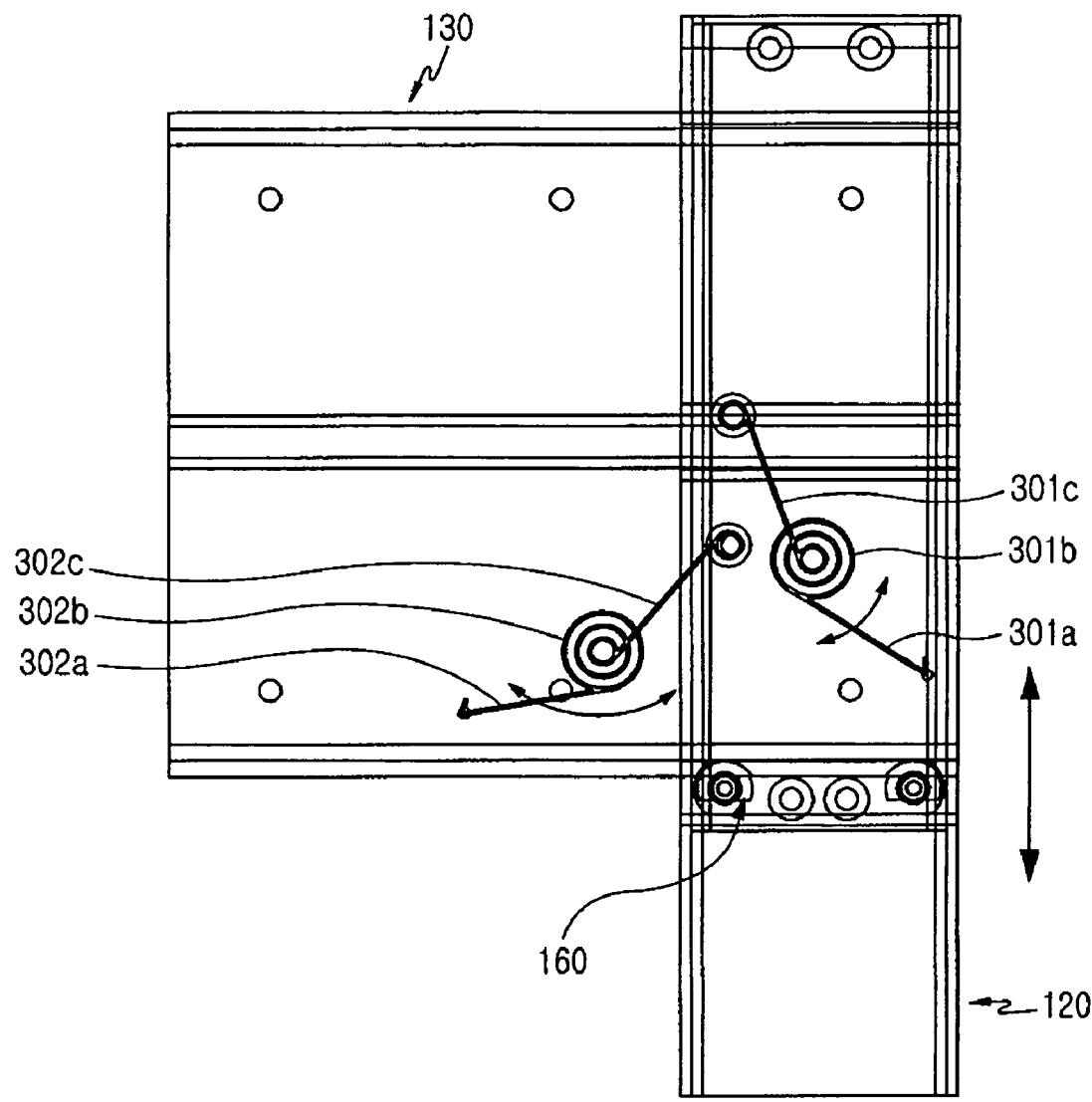
FIG. 36 is a perspective view showing an example of a sliding device for a dual sliding-type portable communication apparatus, before operation, according to an embodiment of the present invention.

As shown in the exemplary embodiments of FIGS. 36 and 37, an end of the first spring member 301 is configured as a free end 301a, which is coupled to a hole 1201 formed on the first sliding member 120 and rotates according to the sliding movement. The central portion 301 of the first spring member 301 has a ring spring 301b positioned thereon, which is adapted to rotate along a predetermined trajectory when the first sliding member 120 slides and provide it with an elastic force so that it can slide semi-automatically. The other end of the first spring member 301 is configured as a fixed end 301c, which is coupled to a spring coupling member 500 positioned on the base member 110. The spring coupling member 500 is coupled to a coupling hole 1101 formed on the base member 110 to support the fixed end 301.

When the sliding housing 30 is slid towards the main housing 20 in the longitudinal direction A1, as shown in the exemplary embodiment of FIG. 36, it slides semi-automatically via the elastic force from the first spring member 301 and returns to the original position.

Figure 35:
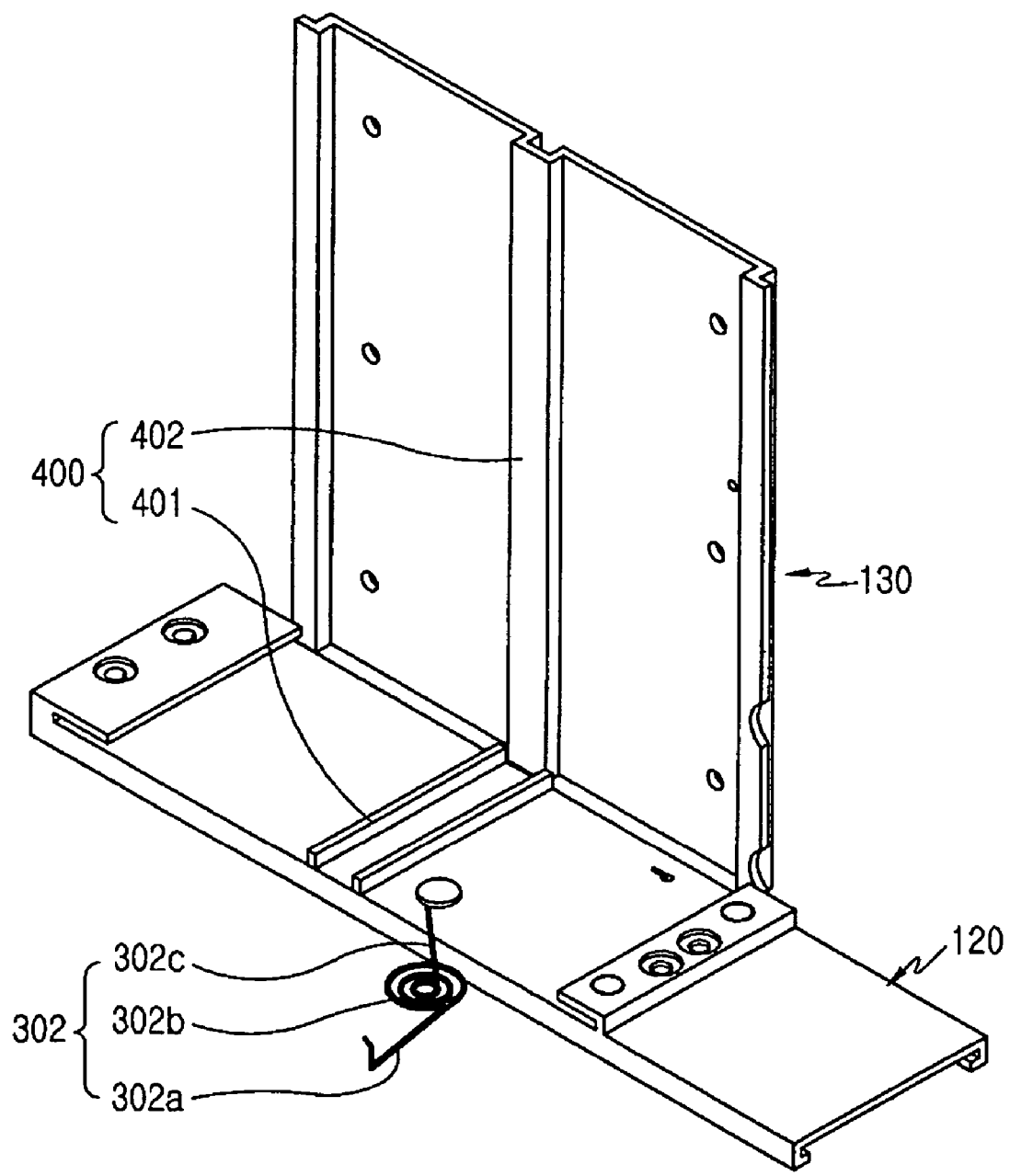
FIG. 35 is an exploded perspective view showing an example of a first and second sliding members of a sliding device for a dual sliding-type portable communication apparatus according to an embodiment of the present invention.

As shown in the exemplary embodiment of FIG. 35, the sliding housing 30 is then slid from the main housing 20 in the perpendicular direction A2. A guide member 400 is positioned between the first and second sliding members 120 and 130 to guide the sliding housing 30 so that it can slide from the main housing 20 in the perpendicular direction A2.

Figure 38:
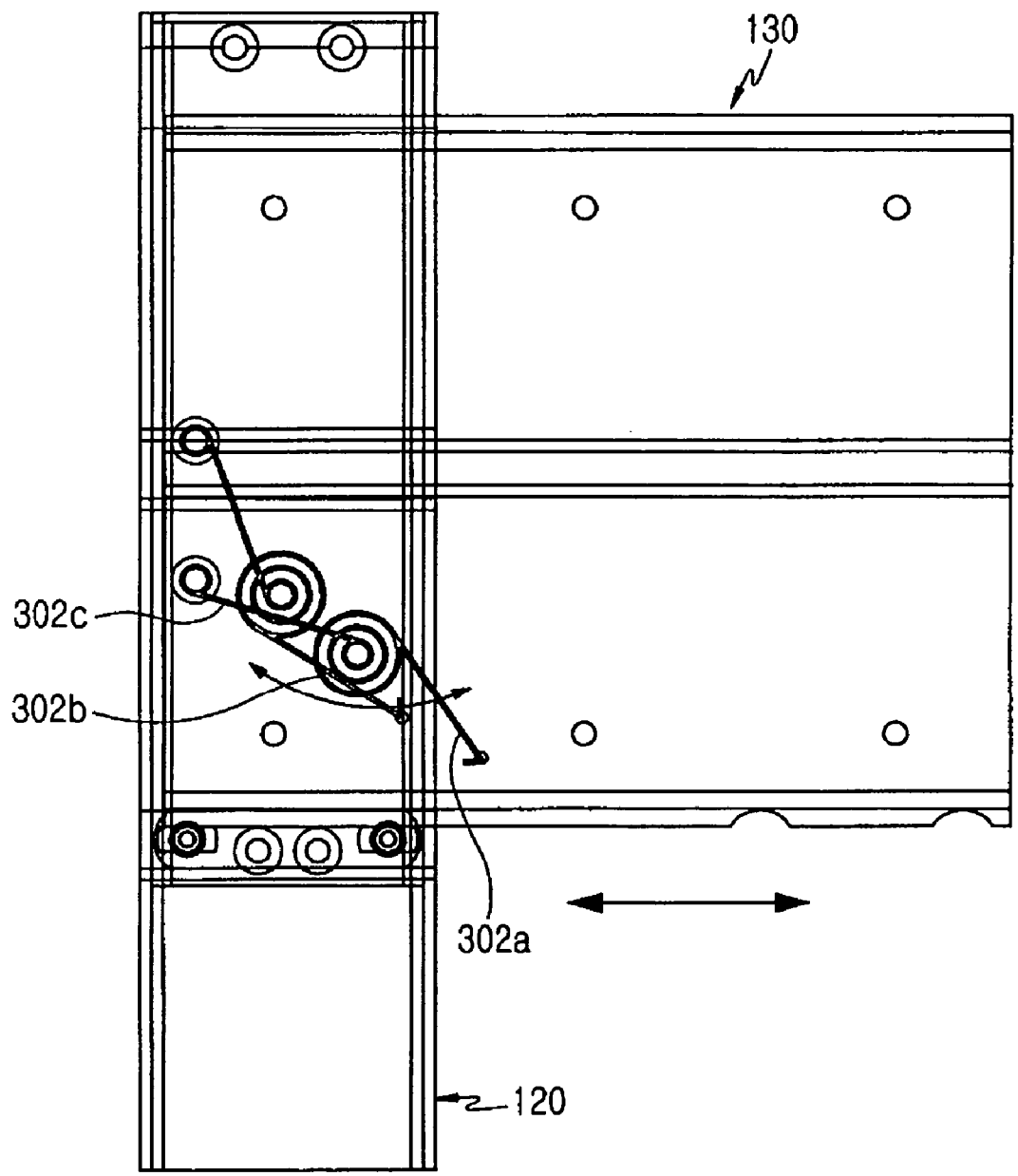
FIG. 38 is a top view showing an example of a sliding device for a dual sliding-type portable communication apparatus according to an embodiment of the present invention, after it has slid in a direction perpendicular to the longitudinal direction.

As shown in the exemplary embodiment of FIG. 38, the guide member 400 includes a pair of guide rails 401 and a guide unit 402. The guide rails 401 are formed on the upper surface of the first sliding member 120 in the perpendicular direction A2 to guide the second sliding member 130 so that it slides along them. The guide unit 402 is formed on the lower surface of the second sliding member 130 and is coupled to the guide rails 401 in such a manner that it can slide. The guide unit 402 is guide-moved along the guide rails 401 in the perpendicular direction A2. The second sliding member 130 semi-automatically slides in the perpendicular direction A2 by means of the elastic force from the second spring member 302.

As shown in the exemplary embodiments of FIGS. 35 and 38, an end of the second spring member 302 is configured as a free end 302a, which is coupled to a hole 1301 formed on the second sliding member 130 and rotates according to the sliding movement. The central portion of the second spring member 302 has a ring spring 302b positioned thereon, which is configured to rotate along a predetermined trajectory when the second sliding member 130 slides and provide it with an elastic force so that it can slide semi-automatically. The other end of the second spring member 302 is configured as a fixed end 302c, which is coupled to a spring coupling member 500 positioned on first sliding member 120. The spring coupling member 500 is coupled to a coupling hole 1202 formed on the first sliding member 120 to support the fixed end 302c.

The operation of a sliding device for a dual sliding-type portable communication apparatus according to a fourth exemplary implementation of the present invention will now be described in detail with reference to the exemplary embodiments of FIGS. 39 to 47.

Figure 39:
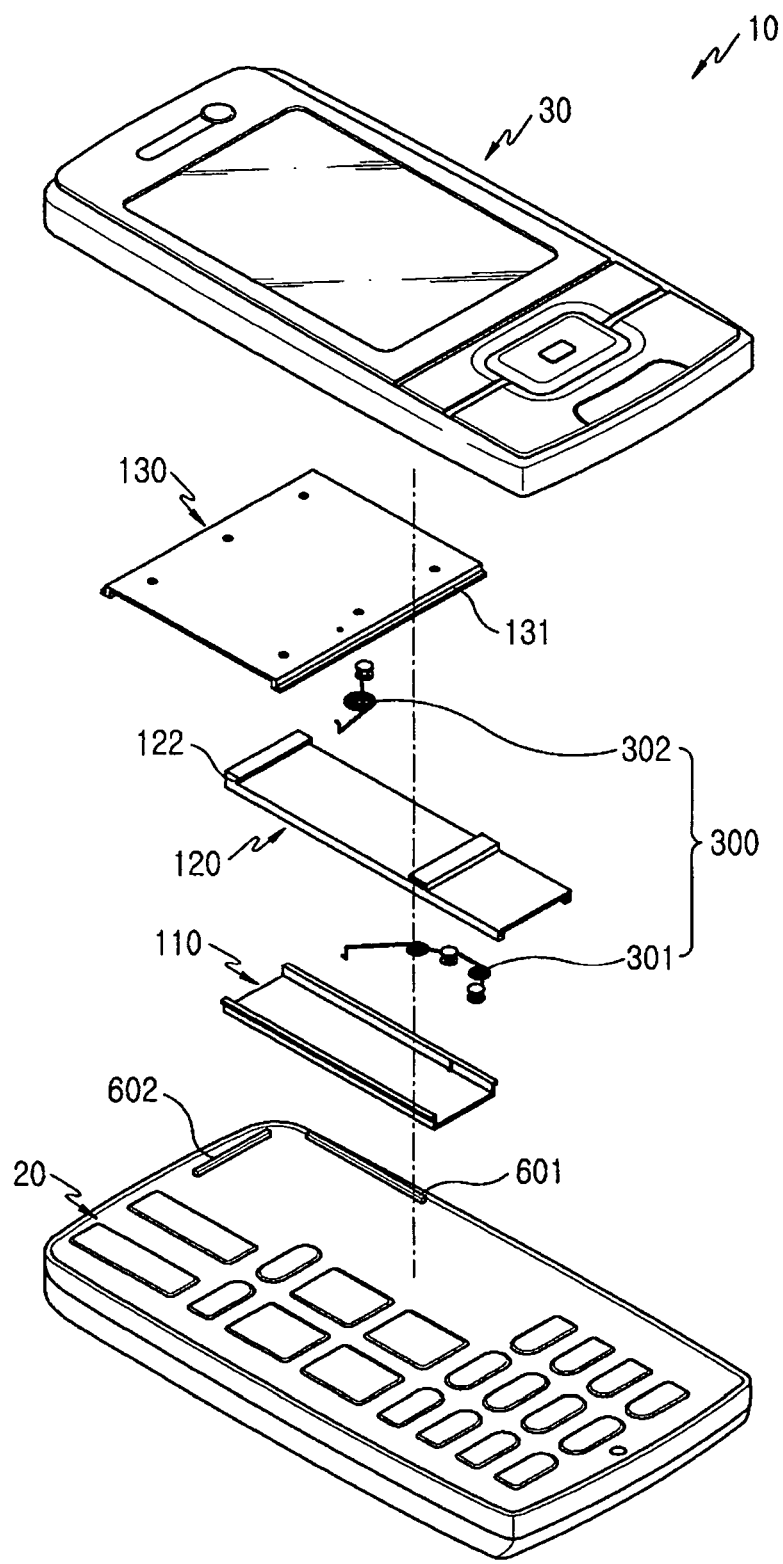
FIG. 39 is an exploded perspective view showing an example of the construction of a sliding device for a dual sliding-type portable communication apparatus according to a fourth embodiment of the present invention.
Figure 42:
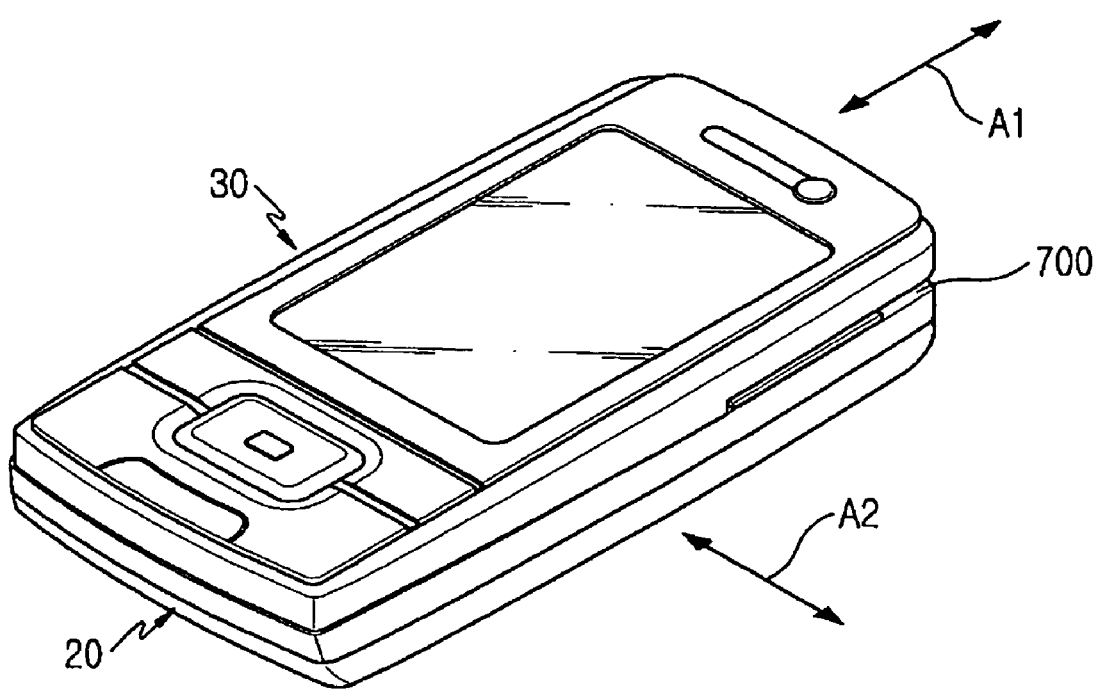
FIG. 42 is an assembled perspective view showing an example of a sliding device for a dual sliding-type portable communication apparatus according to an embodiment of the present invention.

As shown in the exemplary embodiments of FIGS. 39 and 42, the sliding device has a base member 110 fastened to the main housing 20 by screws and a first sliding member 120 arranged, for example by lamination, on the upper portion of the base member 110 to semi-automatically slide the sliding housing 30 from the main housing 20 in the longitudinal direction A1. The first sliding member 120 has a second sliding member 130 arranged, for example by lamination, on the upper portion thereof to semi-automatically slide the sliding housing 30 from the main housing 20 in the perpendicular direction A2 to the longitudinal direction A1. The first sliding member 120 has a second guide slot 122 formed on the upper portion thereof to be coupled to a guide rib 131 formed on the second sliding member 130 in such a manner that it can slide in the perpendicular direction A2. The guide rib 131 of the second sliding member 130 is coupled to the second guide slot 122 in such a manner that it can slide in the perpendicular direction A2.

Figure 40:
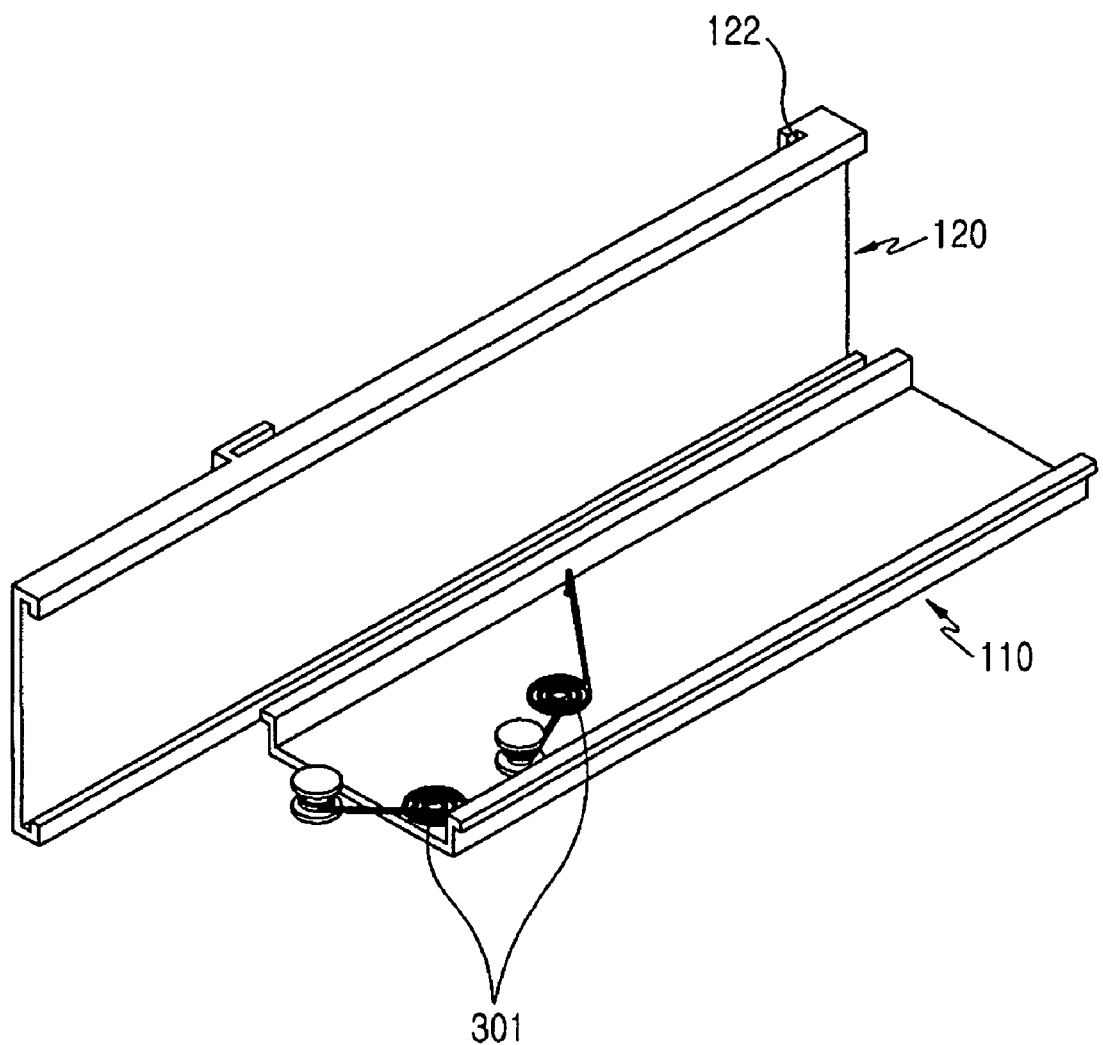
FIG. 40 is an exploded perspective view showing an example of first and second sliding members of a sliding device for a dual sliding-type portable communication apparatus according to an embodiment of the present invention.

As shown in the exemplary embodiments of FIGS. 39 and 40, at least one elastic member 300 is positioned between each member 110, 120, and 130 to provide an elastic force so that the first and second sliding members 120 and 130 can slide semi-automatically.

The elastic member 300 includes first and second spring members 301 and 302.

As shown in the exemplary embodiments of FIG. 40, the first spring member 301 is positioned between the base member 110 and the first sliding member 120. The second spring member 302 is positioned between the first sliding member 120 and the second sliding member 130.

As shown in the exemplary embodiment of FIG. 40, the first spring member 301 includes two spring members to provide an elastic force more efficiently when the sliding housing 30 slides semi-automatically.

The first spring member 301 provides an elastic force so that the first sliding member 120 can slide semi-automatically in the longitudinal direction A1.

The second spring member 302 provides an elastic force so that the second sliding member 130 can slide semi-automatically in the perpendicular direction A2.

Figure 41:
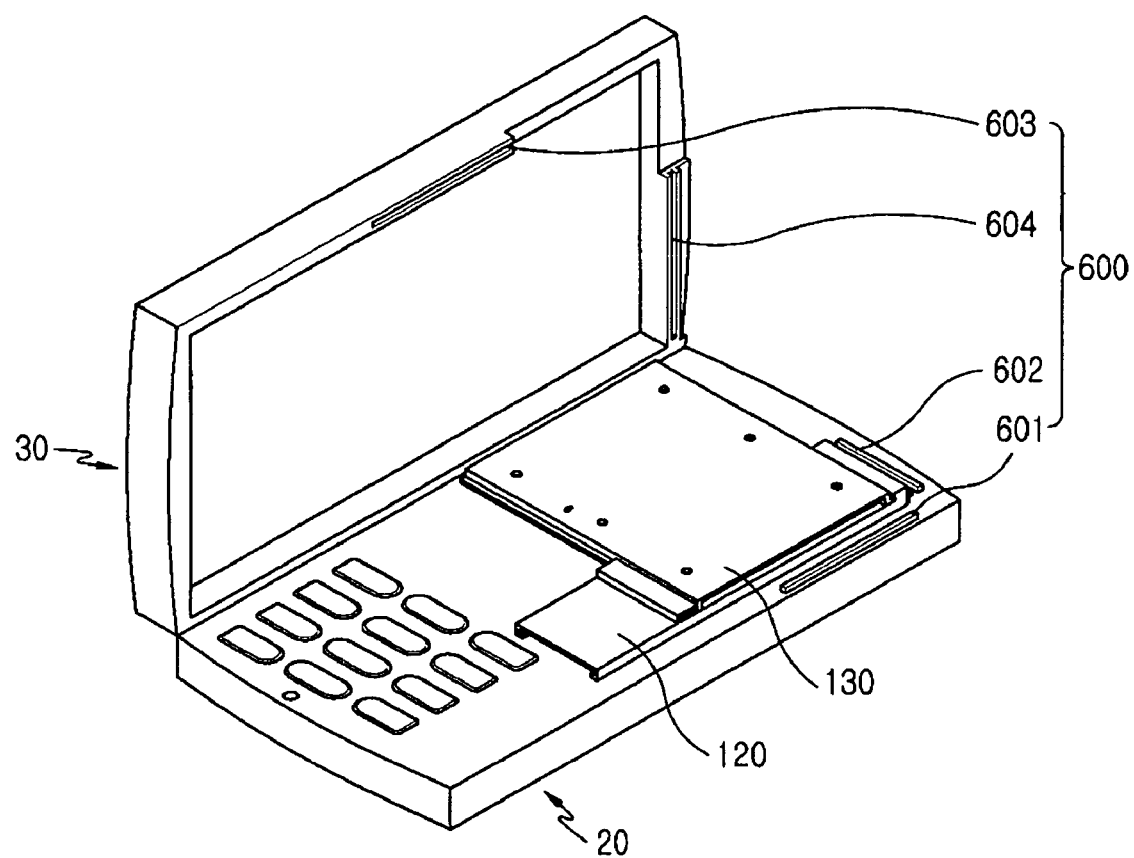
FIG. 41 is a perspective view showing an example of a guide stopper member of a sliding device for a dual sliding-type portable communication apparatus according to an embodiment of the present invention.
Figure 43:
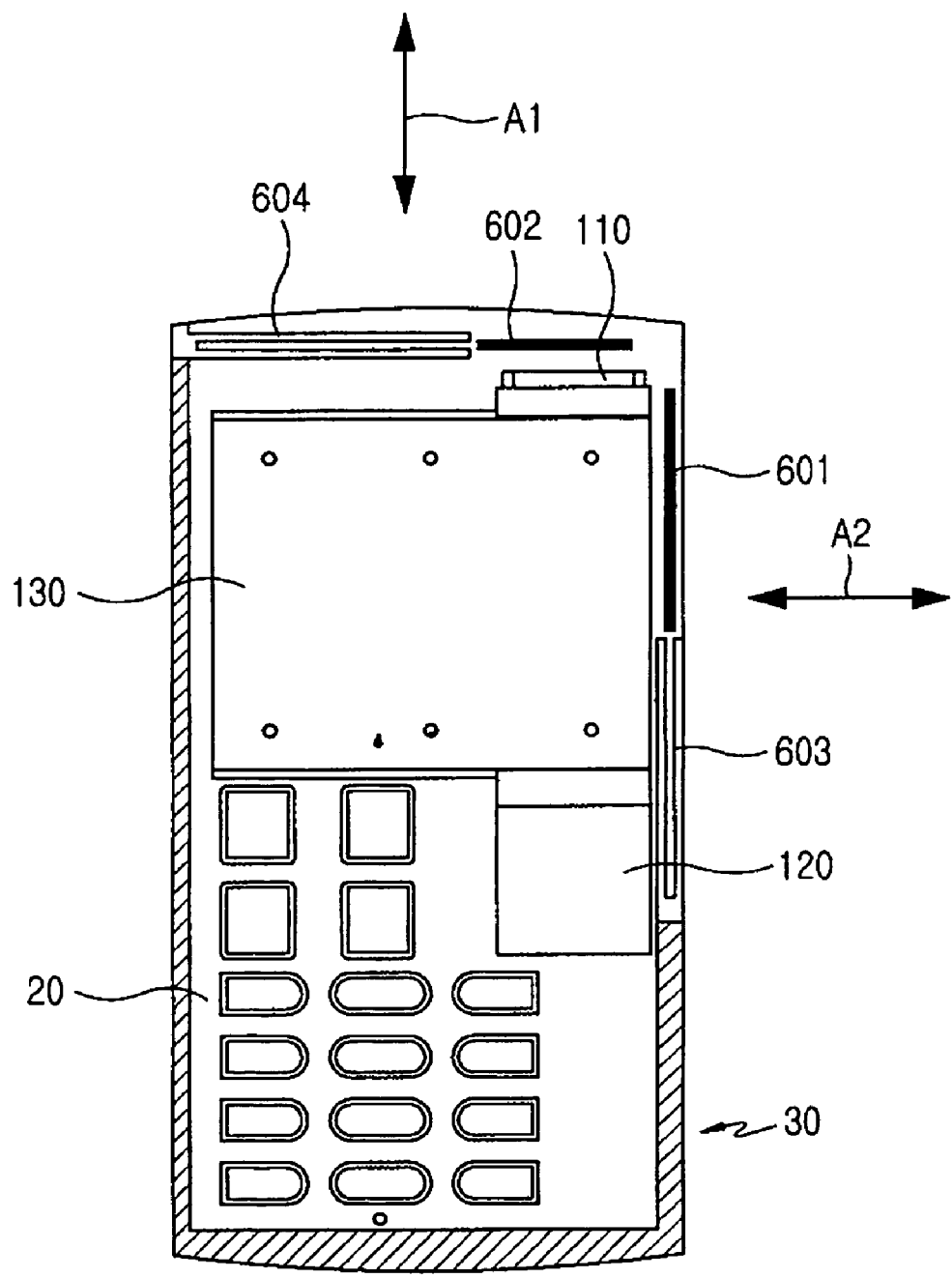
FIG. 43 is a sectional top view showing an example of a sliding device for a dual sliding-type portable communication apparatus, before operation, according to an embodiment of the present invention.

As shown in the exemplary embodiments of FIGS. 41 and 43, the housings 200 and 300 have a guide stopper member 600 configured to guide and restrict the sliding housing 30 in such a manner that it can slide from the main housing 20 independently in the longitudinal direction A1 and in the perpendicular direction A2, respectively, and stop in the respective final positions after the sliding movement.

The guide stopper member 600 includes first and second guide members 601 and 602 and first and second guide stopper units 603 and 604.

Figure 44:
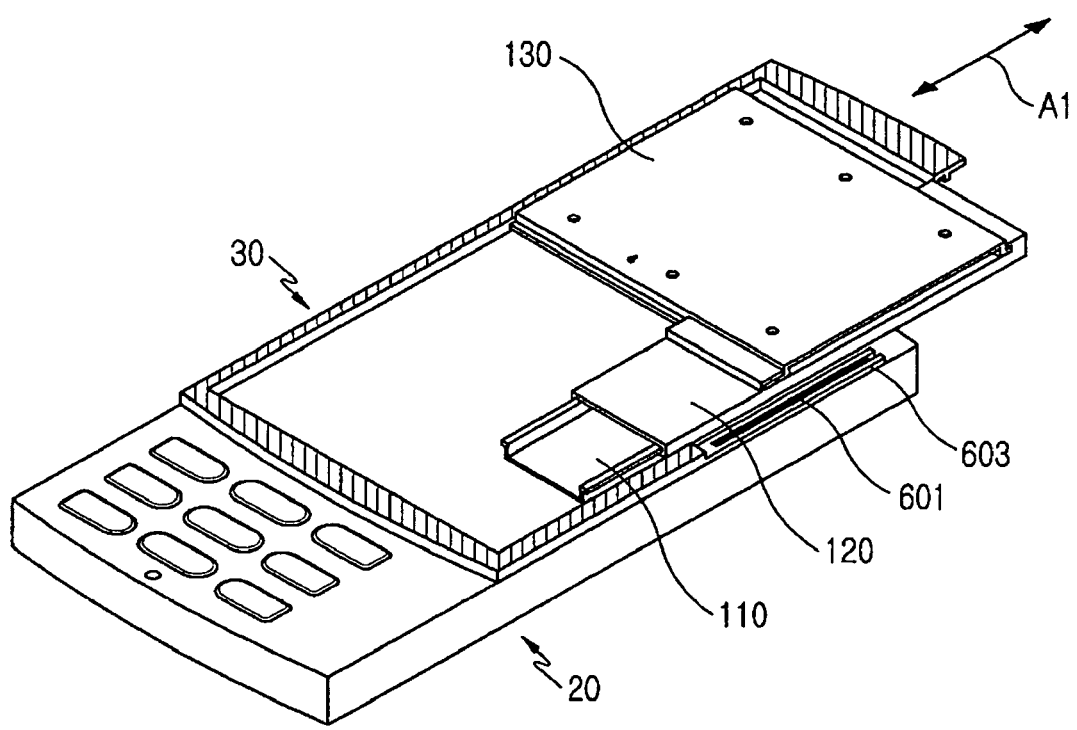
FIG. 44 is a sectional perspective view showing an example of a sliding device for a dual sliding-type portable communication apparatus according to an embodiment of the present invention, after it has moved in the longitudinal direction.
Figure 45:
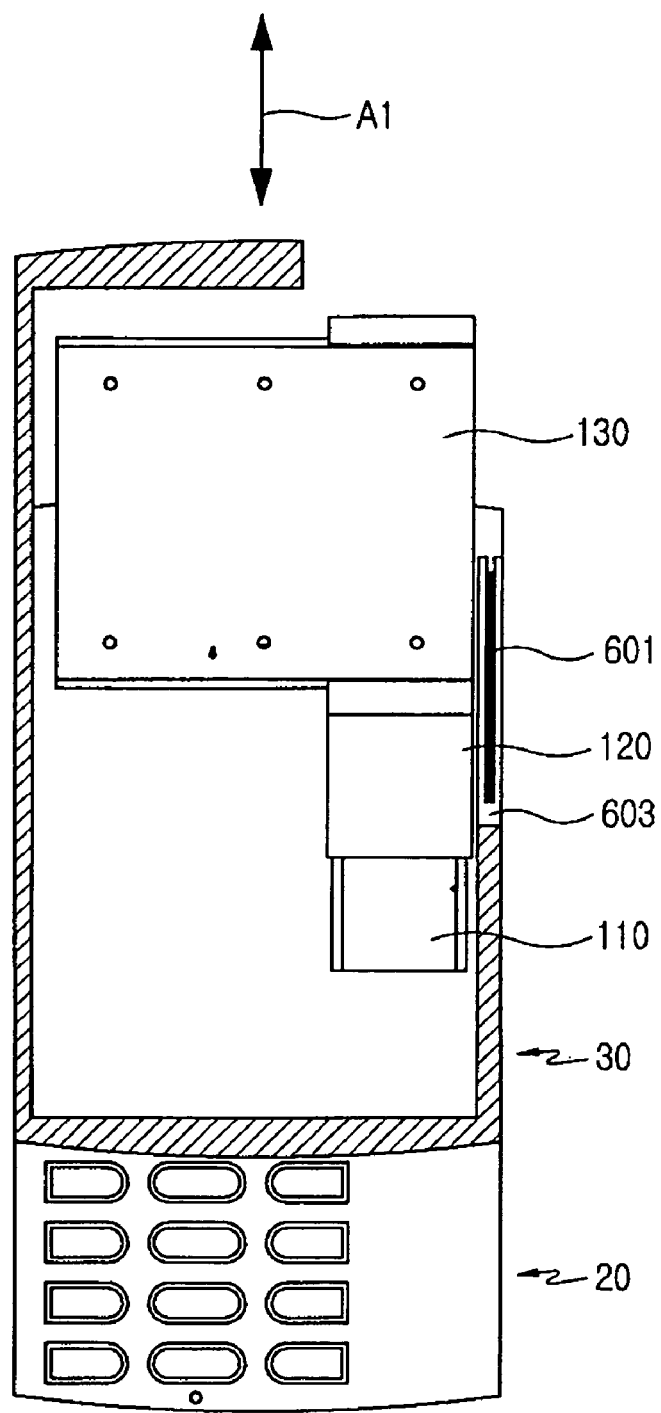
FIG. 45 is a sectional top view showing an example of a sliding device for a dual sliding-type portable communication apparatus according to an embodiment of the present invention, after it has moved in the longitudinal direction.

When the sliding housing 30 slides away from the main housing 20, as shown in the exemplary embodiments of FIGS. 44 and 45, the first sliding member 120 slides together. Particularly, it slides semi-automatically in the longitudinal direction A1 via the elastic force from the first spring member 301.

As shown in the exemplary embodiment of FIG. 45, the first guide member 601 is formed on the upper surface of the main housing 20 in the longitudinal direction A1. The first guide stopper unit 603 is formed on the lower end surface of the sliding housing 30 and is inserted into the first guide member 601 when the sliding housing 30 moves in the longitudinal direction A1.

The first guide stopper unit 603 guide-moves along the first guide member 601, which then contacts an end of the first guide stopper unit 603 and stops it in the final position of the sliding movement. As the first guide stopper unit 603 stops, the sliding housing 30 stops moving together. As shown in the exemplary embodiment of FIG. 45, the first guide stopper unit 603 is inserted into the first guide member 601 and restricts the movement of the sliding housing 30 in the perpendicular direction A2.

Figure 46:
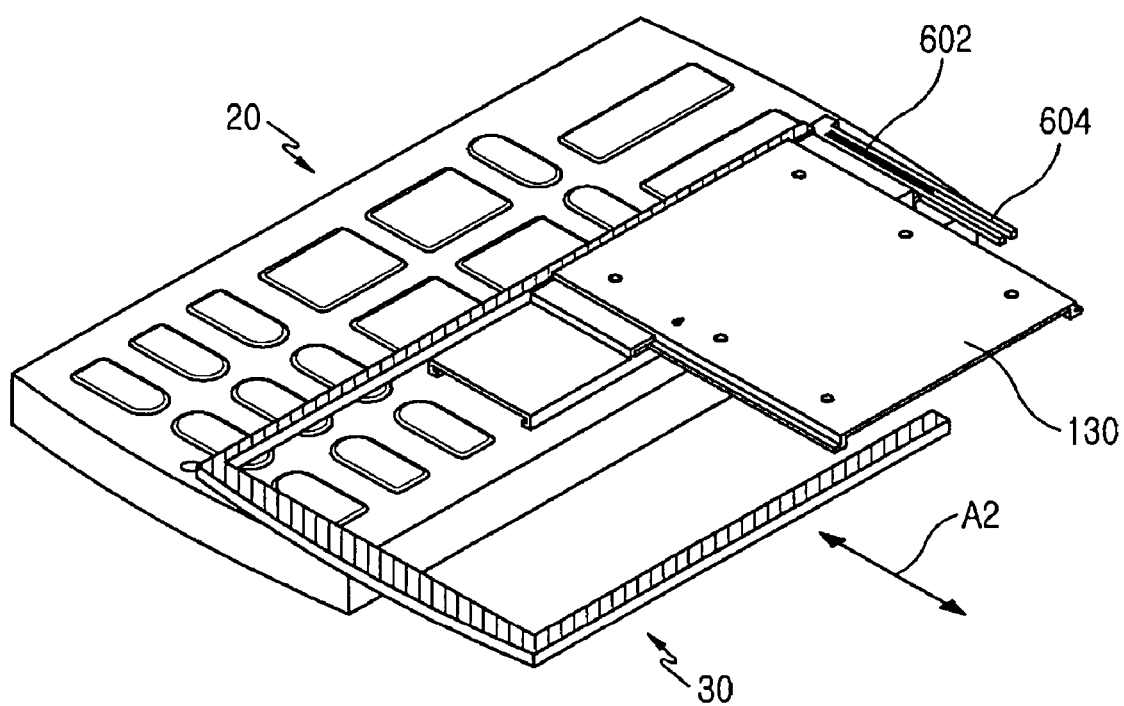
FIG. 46 is a sectional perspective view showing an example of a sliding device for a dual sliding-type portable communication apparatus according to an embodiment of the present invention, after it has moved in the perpendicular direction to the longitudinal direction.
Figure 47:
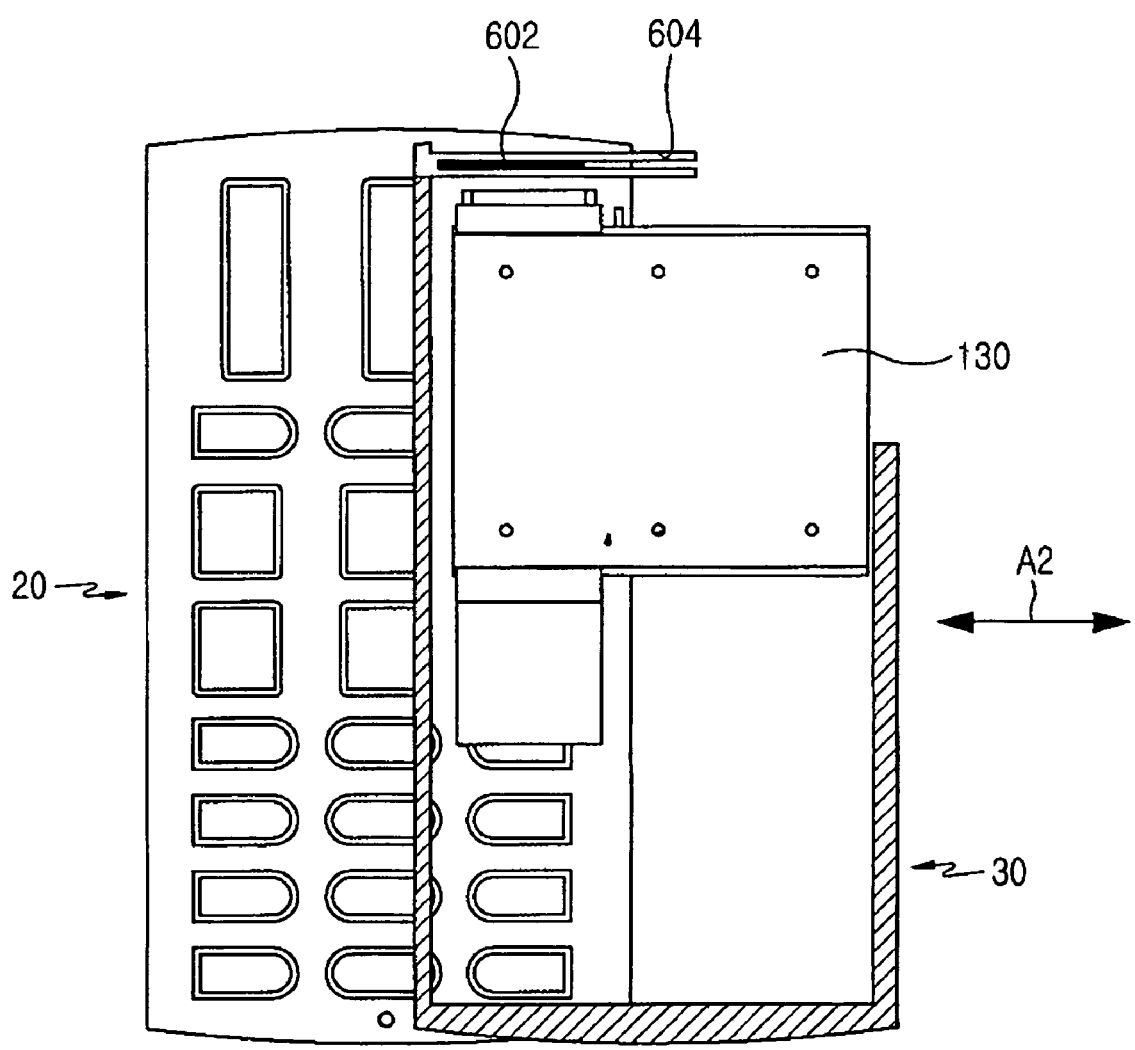
FIG. 47 is a sectional top view showing an example of a sliding device for a dual sliding-type portable communication apparatus according to an embodiment of the present invention, after it has moved in the perpendicular direction to the longitudinal direction.

When the sliding housing 30 slides towards the main housing 20, as shown in the exemplary embodiment of FIG. 43, the first guide stopper unit 603 slides together and is released from the first guide member 601. Then, restriction on the movement of the sliding housing 30 in the perpendicular direction A2 is released. When the sliding housing 30 slides away from the main housing 20 in the perpendicular direction A2, as shown in FIGS. 46 and 47, the second sliding member 130 slides together. Particularly, it slides semi-automatically in the perpendicular direction A2 via the elastic force from the second spring member 302.

As shown in the exemplary embodiment of FIG. 47, the second guide member 602 is formed on the upper surface of the main housing 20 in the perpendicular direction A2. The second guide stopper unit 604 is formed on the lower end surface of the sliding housing 30 and is inserted into the second guide member 602 when the sliding housing 30 moves in the perpendicular direction A2.

The second guide stopper unit 604 guide-moves along the second guide member 602, which then contacts an end of the second guide stopper unit 604 and stops it in the final position of the sliding movement. As the second guide stopper unit 604 stops, the sliding housing 30 stops moving together. As shown in the exemplary embodiment of FIG. 47, the second guide stopper unit 604 is inserted into the second guide member 602 and restricts the movement of the sliding housing 30 in the longitudinal direction A1.

When the sliding housing 30 slides towards the main housing 20 in the perpendicular direction A2, as shown in the exemplary embodiment of FIG. 43, the second guide stopper unit 604 slides together and is released from the second guide member 602. Then, restriction on the movement of the sliding housing 30 in the longitudinal direction A1 is released. As shown in the exemplary embodiments of FIG. 42, the sliding housing 30 has a receiving groove 700 formed on a lateral surface thereof to receive the first and second guide members 601 and 602 in a releasable manner as the housing moves in the longitudinal direction A1 or in the perpendicular direction A2.

As mentioned above, the exemplary implementations of the present invention can be advantageous in that, since the sliding housing is adapted to be moved in the perpendicular direction to the longitudinal direction and positioned parallel to the main housing, the service region of the apparatus increases and a larger number of keys can be positioned thereon. This makes it possible to conveniently operate keys using both hands when inputting characters or when used in a game mode.

While the invention has been shown and described with reference to certain exemplary embodiments thereof, it will be understood by those skilled in the art that various changes in form and details may be made therein without departing from the spirit and scope of the exemplary embodiments of the invention as defined by the appended claims.

What is claimed is:

1. A dual sliding-type portable communication apparatus comprising:
   a main housing;
   a sliding housing configured to slide on the main housing to expose/hide the main housing;
   a slider coupled to the sliding housing; and
   a dual sliding guide, slidably coupled to the main housing and slidably coupled to the slider, which enables the sliding housing to slide towards and away from the main housing in longitudinal and perpendicular directions with respect to the main housing.

2. The dual sliding-type portable communication apparatus as claimed in claim 1, wherein the slider has at least one guide rod fixed to each of two lateral surfaces thereof, to which the dual sliding guide is coupled while being configured to slide in the longitudinal direction, and the dual sliding guide has a sliding movement device positioned on a lateral surface thereof, which is coupled to a surface of the main housing and slides the sliding housing in the perpendicular direction.

3. The dual sliding-type portable communication apparatus as claimed in claim 2, wherein the guide rod comprises a substantially cylindrical shape.

4. The dual sliding-type portable communication apparatus as claimed in claim 2, wherein the sliding movement device comprises:
a guide member extending in the perpendicular direction;
a pair of guide rail disposed on the interior of the guide member;
at least one sliding boss coupled to the guide rail which slides along the longitudinal direction of the guide rail; and
a boss protrusion protruding from a lateral surface of the boss configured to be fixedly coupled to the main housing.

5. The dual sliding-type portable communication apparatus as claimed in claim 4, wherein the sliding boss is configured to move linearly.

6. The dual sliding-type portable communication apparatus as claimed in claim 4, wherein the sliding boss comprises a sliding hole formed thereon, through which the guide rail extends to be slidably coupled thereto.

7. The dual sliding-type portable communication apparatus as claimed in claim 1, wherein at least one elastic member is positioned between the dual sliding guide and the slider to provide an elastic force so that the sliding housing can slide in the longitudinal direction.

8. The dual sliding-type portable communication apparatus as claimed in claim 7, wherein the elastic member comprises a wire spring.

9. The dual sliding-type portable communication apparatus as claimed in claim 1, wherein the sliding housing is configured to slide in the longitudinal direction via the guide rod of the slider and expose the first key array of the main housing and is also configured to slide in the perpendicular direction via the sliding movement device of the dual sliding guide to be positioned parallel to the main housing and expose both first and second key arrays of the main housing.

10. A dual sliding-type portable communication apparatus comprising:
a main housing;
a sliding housing configured to slide on the main housing to expose/hide the main housing;
a slider coupled to the sliding housing; and
a dual sliding guide, slidably coupled to the main housing and slidably coupled to the slider, which enables the sliding housing to slide towards and away from the main housing in longitudinal and perpendicular directions with respect to the main housing;
wherein the dual sliding guide comprises:
a base member;
a first sliding member to slide the sliding housing from the main housing in the longitudinal direction; and
a second sliding member movably arranged on the first sliding member to slide the sliding housing from the main housing in the perpendicular direction.

11. The dual sliding-type portable communication apparatus as claimed in claim 10, wherein the base member comprises a sliding movement unit extending in the longitudinal direction and having a groove formed on the interior thereof to accommodate the first force supply member, the sliding movement unit being adapted to slide the first sliding member in the longitudinal direction or restrict movement.

12. The dual sliding-type portable communication apparatus as claimed in claim 11, wherein the sliding movement unit comprises first and second guide surfaces formed thereon to guide the first force supply member and at least one first and second stopper grooves formed on an end of each of the first and second guide surfaces to restrict the sliding movement in the longitudinal direction from the initial position to the final position as a roller unit provided on the first force supply member is fastened/released.

13. The dual sliding-type portable communication apparatus as claimed in claim 12, wherein the first and second guide surfaces are substantially symmetric to each other and become narrower towards the center, at which first and second points of curvature are established, respectively, and become wider again past the first and second points of curvature, which define corresponding curves.

14. The dual sliding-type portable communication apparatus as claimed in claim 10, wherein the base member comprises a base-side guide rib formed on each of both longitudinal ends thereof to be coupled to the first sliding member so that the sliding member can slide and at least one screw fastening portion formed thereon to be coupled to the main housing by screws.

15. The dual sliding-type portable communication apparatus as claimed in claim 10, wherein the first sliding member comprises a first guide slot coupled to a guide rib of the base member so that the first sliding member can slide in the longitudinal direction and a second guide slot formed on the upper portion of the first guide slot and coupled to a guide rib of the second sliding member so that the second sliding member can slide in the perpendicular direction.

16. The dual sliding-type portable communication apparatus as claimed in claim 15, wherein the first guide slot is formed on both lateral surfaces of the first sliding member in the longitudinal direction.

17. The dual sliding-type portable communication apparatus as claimed in claim 15, wherein the second guide slot comprises a first guide member formed in a predetermined position on the interior of the first sliding member in the perpendicular direction and a second guide member facing the first guide member while being substantially symmetrical to each other.

18. The dual sliding-type portable communication apparatus as claimed in claim 17, wherein the first guide member comprises at least one rotation unit formed thereon, which is rotatably coupled to the stopper member.

19. The dual sliding-type portable communication apparatus as claimed in claim 10, further comprising first and second force supply members, which are positioned between each member to provide a force so that the first and second sliding members can slide semi-automatically.

20. The dual sliding-type portable communication apparatus as claimed in claim 19, wherein the first force supply member comprises a pair of torsion springs, an end of each torsion spring is configured as a free end configured to move along the first and second guide surfaces of the sliding movement unit while rotating to provide an elastic force, the central portion thereof is coupled to a spring support protrusion protruding from the lower end surface of the first sliding member, and the other end thereof is configured as a fixed end coupled to a hole formed on the first sliding member.

21. The dual sliding-type portable communication apparatus as claimed in claim 20, wherein a roller unit is mounted on the free end of the torsion spring and is configured to be inserted into a first stopper groove formed on the first guide surface in the initial position of the first sliding member, to be released from the first stopper groove and move along the first and second guide surfaces during sliding movement in the longitudinal direction, and to be inserted into a second stopper groove formed on the second guide surface in the final position.

22. The dual sliding-type portable communication apparatus as claimed in claim 19, wherein the second force supply member is positioned between the upper surface of the first sliding member and the lower surface of the second sliding member.

23. The dual sliding-type portable communication apparatus as claimed in claim 19, wherein the second force supply member comprises a pair of torsion springs, an end of each torsion spring is configured as a free end configured to move along the first and second guide surfaces of the sliding rib while rotating to provide an elastic force, the central portion thereof is coupled to at least one spring support protrusion protruding from the upper surface of the first sliding member, and the other end thereof is configured as a fixed end coupled to a hole formed on the first sliding member.

24. The dual sliding-type portable communication apparatus as claimed in claim 23, wherein a roller unit is mounted on the free end of the torsion spring and is configured to be inserted into the first rib-side stopper groove formed on the first rib-side guide surface in the initial position of the second sliding member, to move along the first and second rib-side guide surfaces during sliding movement in the perpendicular direction, and to be inserted into the second rib-side stopper groove formed on the second rib-side guide surface in the final position.

25. The dual sliding-type portable communication apparatus as claimed in claim 10, wherein the second sliding member comprises a sliding-side guide rib formed on each of both ends thereof, which is coupled to the second guide slot so that the second sliding member can slide in the perpendicular direction, and a sliding rib formed on the lower surface thereof to accommodate the second force supply member therein and semi-automatically slide the second sliding member in the perpendicular direction or restrict its movement.

26. The dual sliding-type portable communication apparatus as claimed in claim 25, wherein the sliding rib comprises first and second rib-side guide surfaces formed thereon to guide the second force supply member and at least one rib-side first and second stopper grooves formed on an end of each of the first and second guide surfaces to restrict the sliding movement in the perpendicular direction from the initial position to the final position as a roller unit provided on the second force supply member is fastened/released.

27. The dual sliding-type portable communication apparatus as claimed in claim 26, wherein the first and second rib-side guide surfaces are substantially symmetric to each other, the guide surfaces become narrower towards the center, at which first and second points of curvature are established, respectively, and the guide surfaces become wider again past the first and second points of curvature, which define corresponding curves.

28. The dual sliding-type portable communication apparatus as claimed in claim 25, wherein the sliding-side guide rib comprises at least one semi-spherical groove formed thereon, which is releasably coupled to the stopper member.

29. The dual sliding-type portable communication apparatus as claimed in claim 10, further comprising at least one stopper member, which selectively restricts the first and second sliding members as each of the first and second sliding members slides so that each member can independently slike in the longitudinal direction an din the perpendicular direction, respectively.

30. The dual sliding-type portable communication apparatus as claimed in claim 29, wherein the rotation stopper unit comprises:
    a hinge unit formed on the upper end of the stopper unit and coupled to a rotation unit of the first sliding member to rotate about a hinge axis;
    a rotation locker unit formed on the lower portion of the hinge unit and configured to move and rotate together, as the members slide, so that it is fastened to or released from a latching groove formed on the base member and the semi-spherical groove of the second sliding member to restrict the sliding movement of the members or release the restriction; and
    a sliding guide unit arranged on the lower portion of the rotation locker unit to guide the first and second sliding members while being able to slide together.

31. The dual sliding-type portable communication apparatus as claimed in claim 10, wherein the main housing and the sliding housing have a locking member configured to guide the sliding housing so that the sliding housing can independently slide from the main housing in the longitudinal direction and in the perpendicular direction or lock and restrict the sliding housing.

32. The dual sliding-type portable communication apparatus as claimed in claim 31, wherein the locking member comprises:
    a first locking member formed on the sliding housing and configured to be locked and inserted into a first latching protrusion formed on the upper surface of the main housing, when the sliding housing slides in the longitudinal direction, to restrict the sliding movement of the sliding housing in the perpendicular direction and
    a second locking member configured to be inserted into a second latching protrusion formed on the upper surface of the main housing, as the sliding housing slides in the perpendicular direction, to restrict the sliding movement of the sliding housing in the longitudinal direction.

33. The dual sliding-type portable communication apparatus as claimed in claim 32, wherein the locking member comprises first and second guide coupling units arranged on the sliding housing, to which the first and second locking members are guide-coupled after being released from the first and second latching protrusions of the main housing, when the sliding housing slides in the longitudinal direction or in the perpendicular direction.

\* \* \* \* \*